Jan. 1, 1946. B. COOPER 2,392,023
AUTOMATIC WEIGHING SCALE
Filed March 13, 1942 14 Sheets-Sheet 2
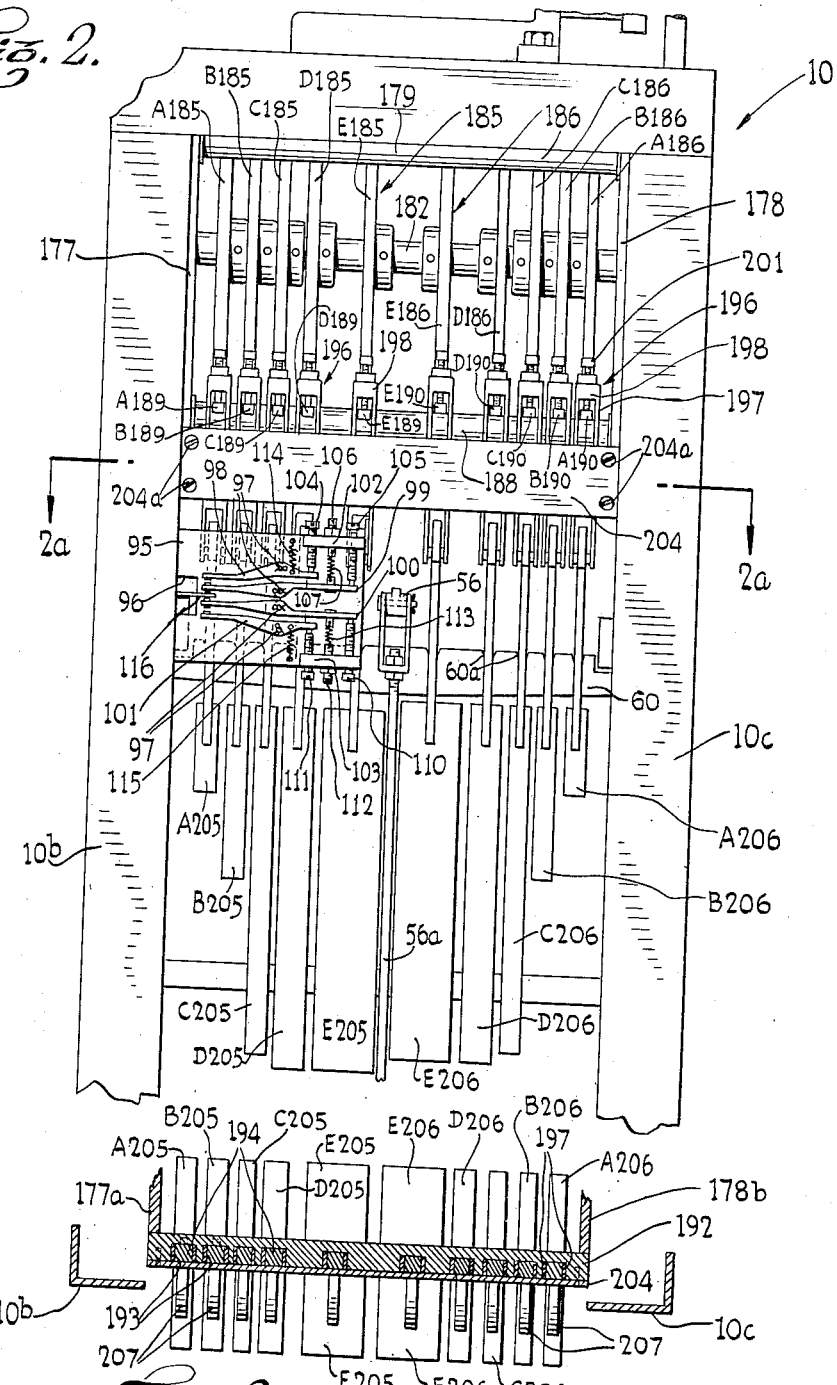
INVENTOR.
BENJAMIN COOPER
BY
J. B. Feldhin
ATTORNEY

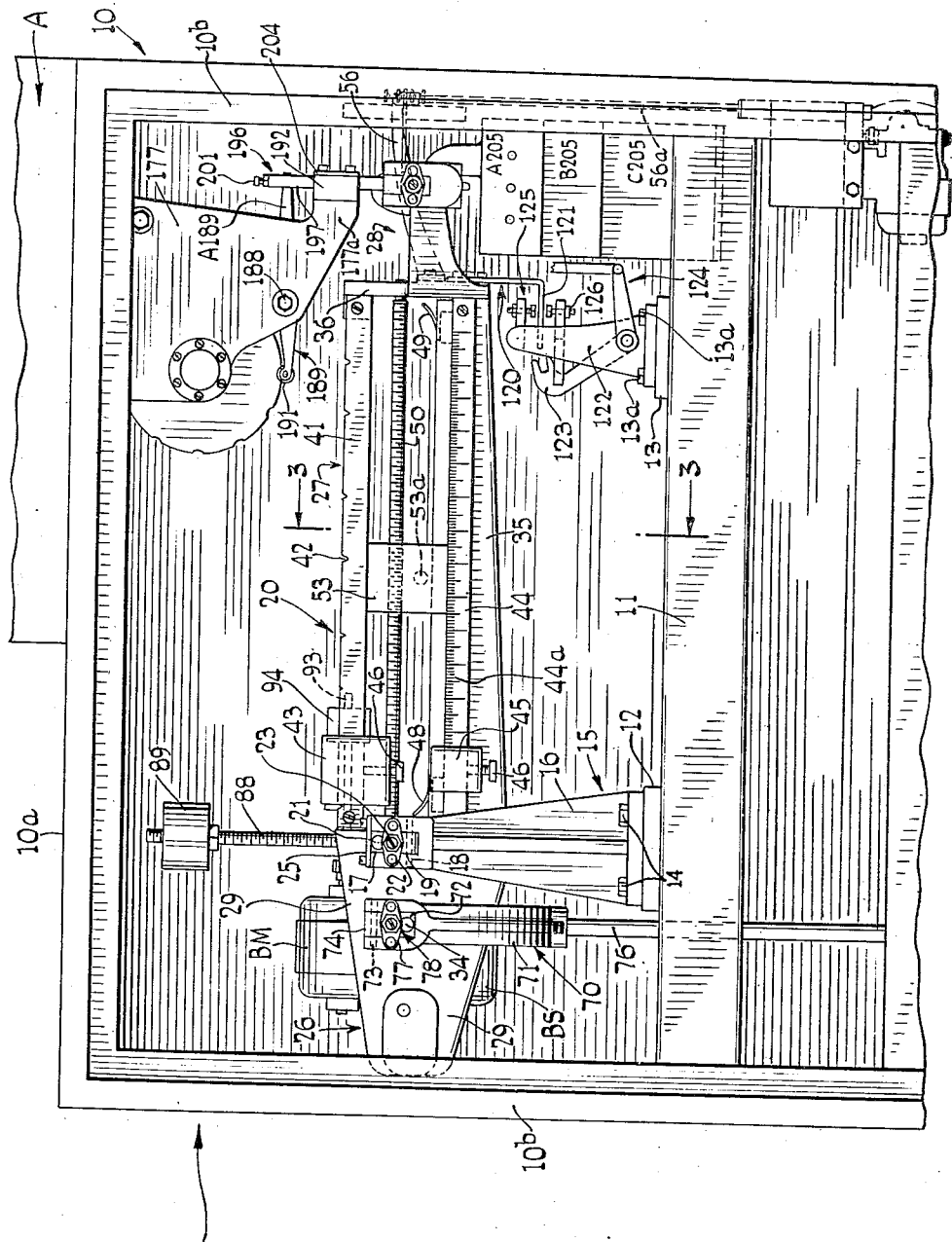

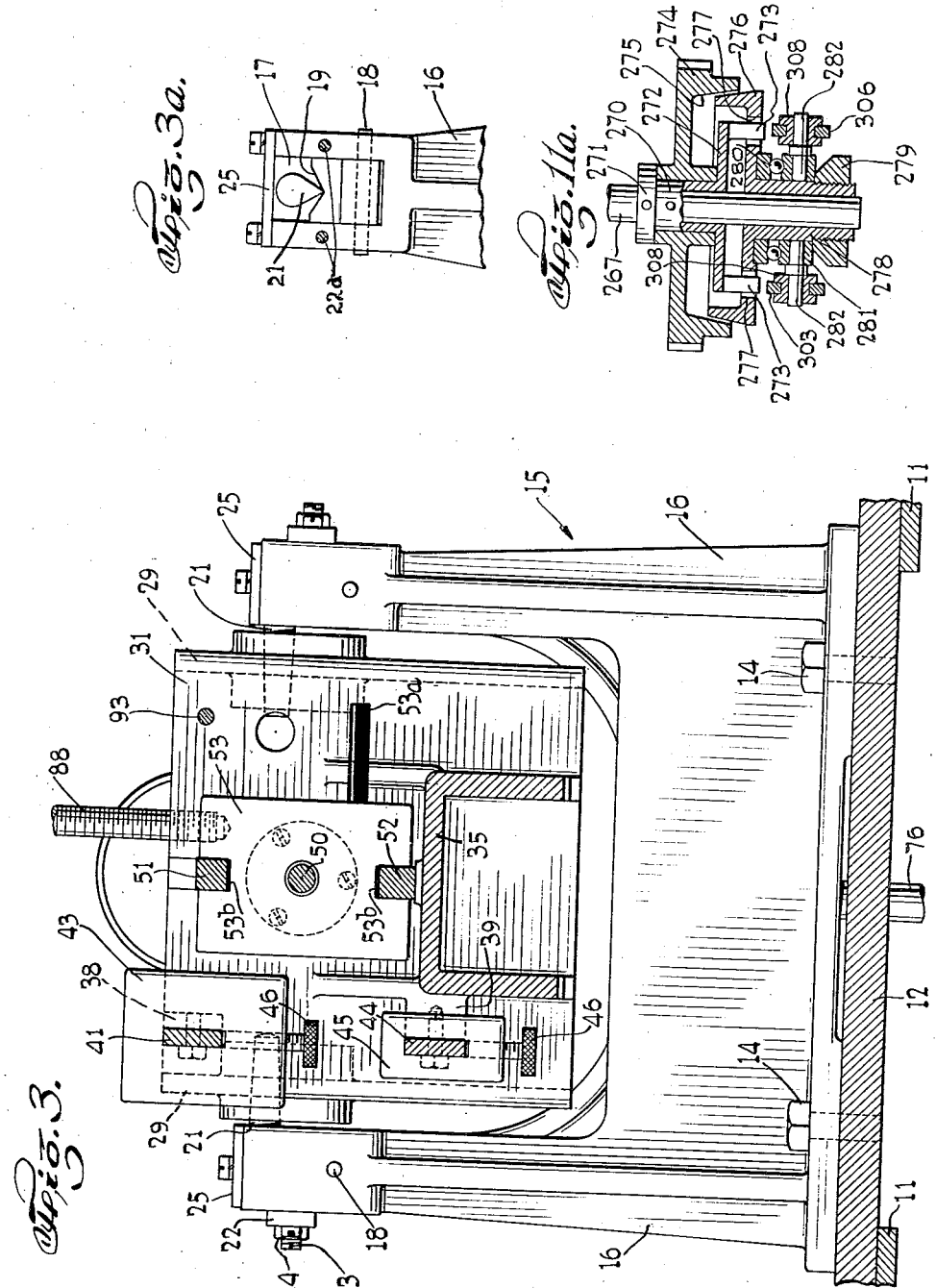

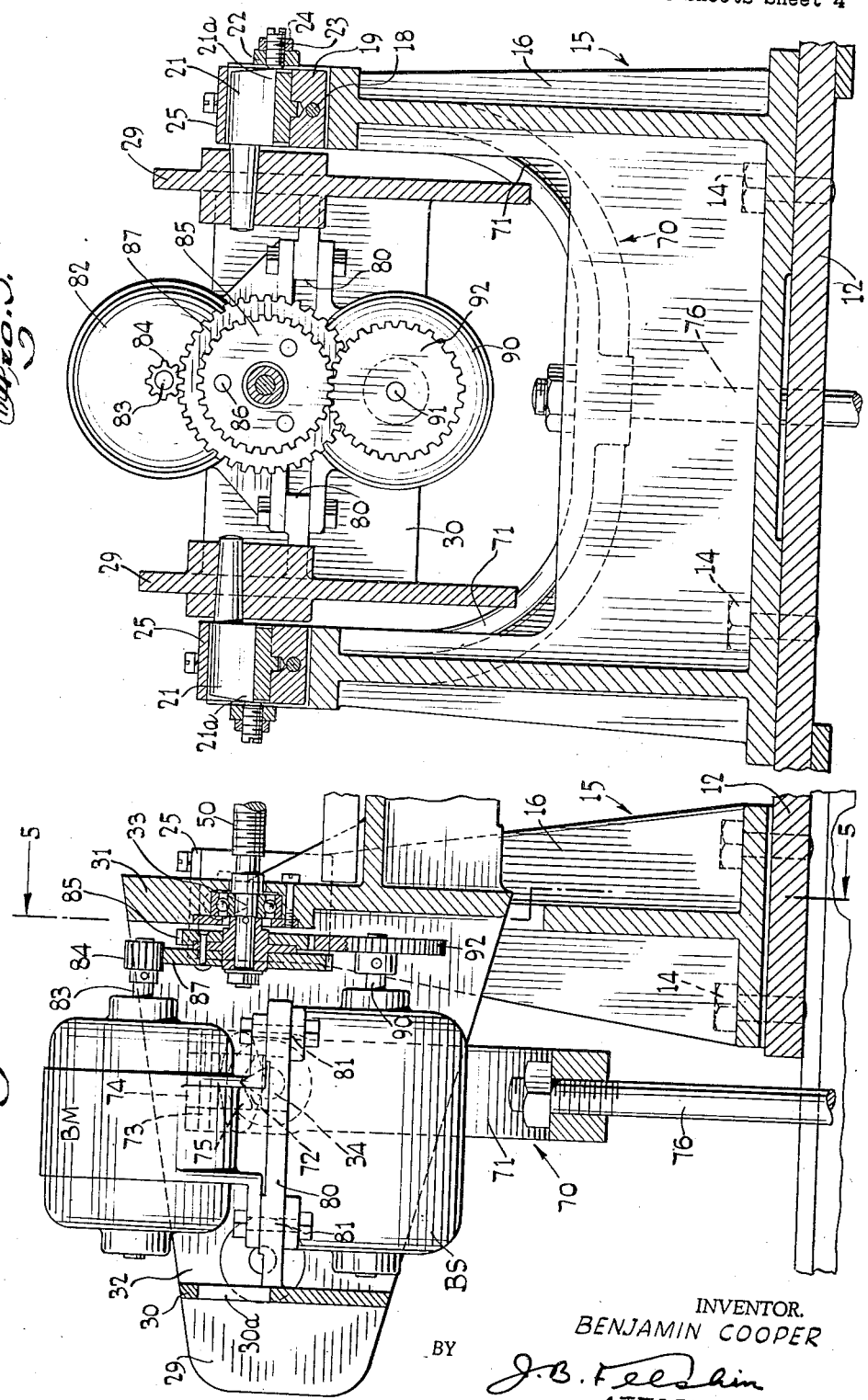

Jan. 1, 1946.  B. COOPER  2,392,023
AUTOMATIC WEIGHING SCALE
Filed March 13, 1942  14 Sheets-Sheet 10
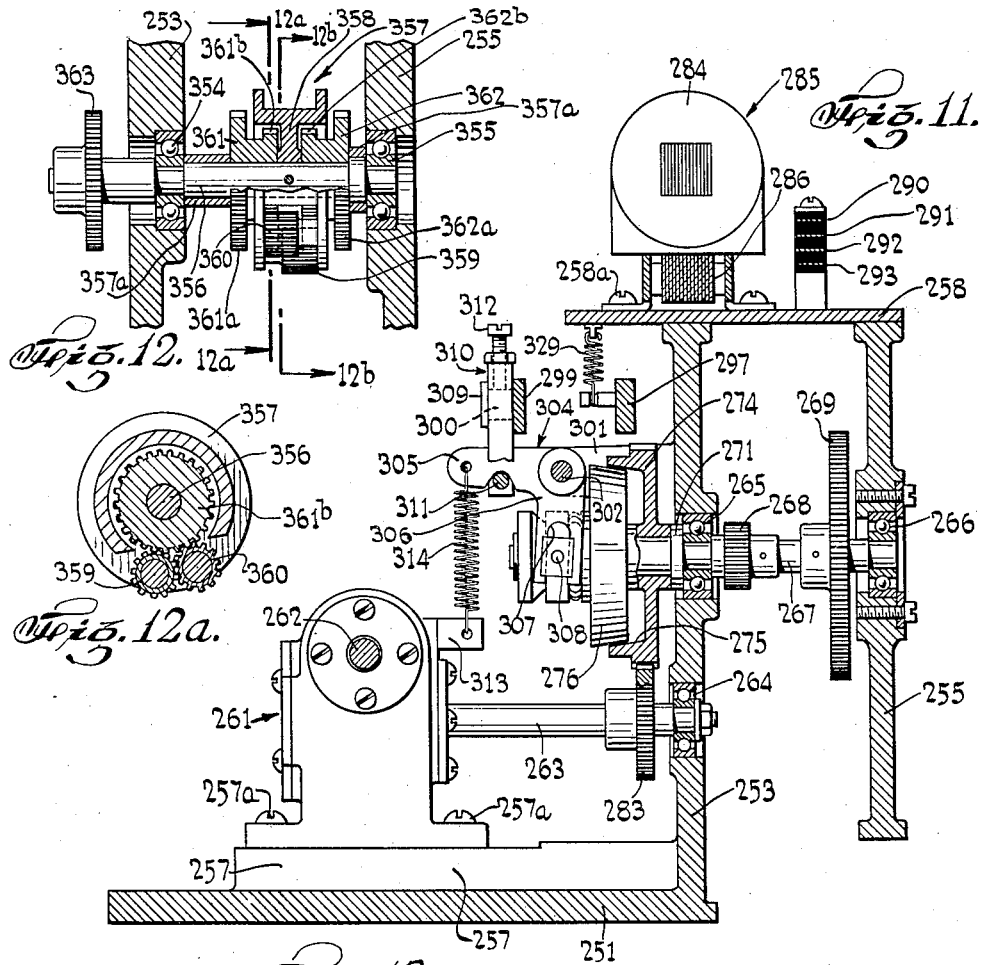
Fig. 11.
Fig. 12.
Fig. 12a.
Fig. 13.
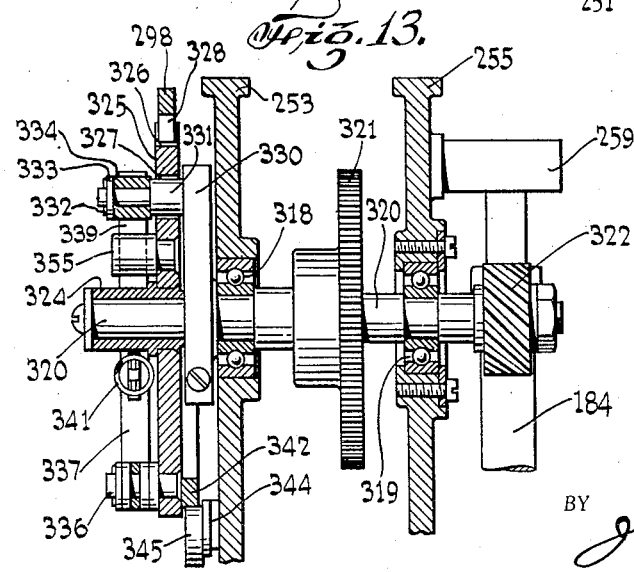
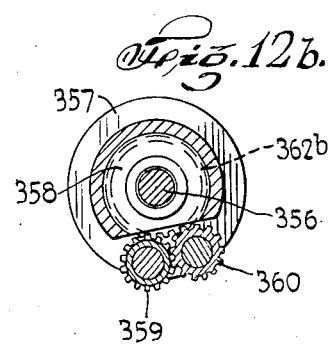
Fig. 12b.
INVENTOR.
BENJAMIN COOPER
BY
J. B. Felshin
ATTORNEY.

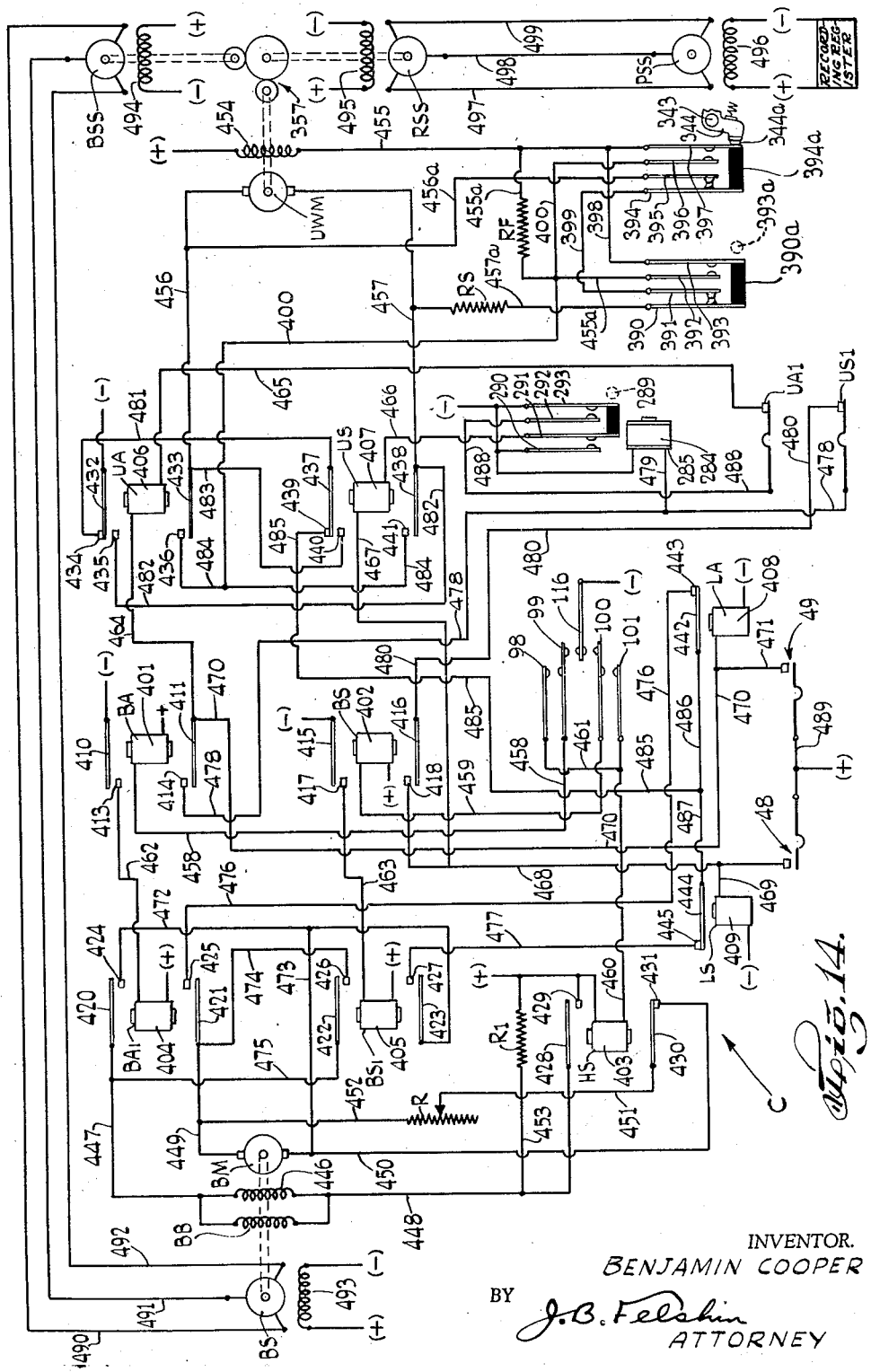

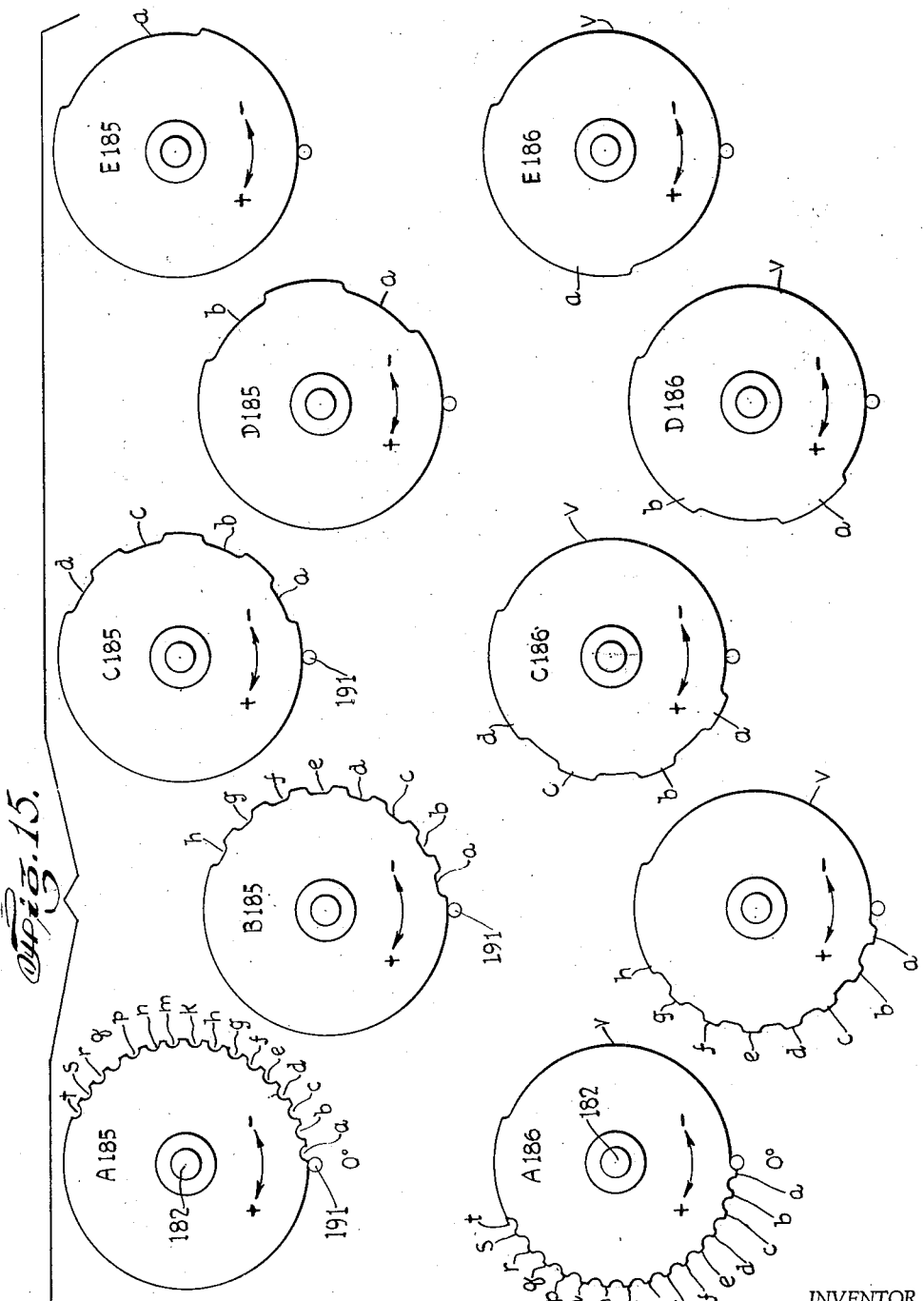

Jan. 1, 1946.   B. COOPER   2,392,023
AUTOMATIC WEIGHING SCALE
Filed March 13, 1942   14 Sheets-Sheet 13

Fig. 16.

INVENTOR.
BENJAMIN COOPER
BY J.B. Felshin
ATTORNEY

Jan. 1, 1946.   B. COOPER   2,392,023
AUTOMATIC WEIGHING SCALE
Filed March 13, 1942   14 Sheets-Sheet 14
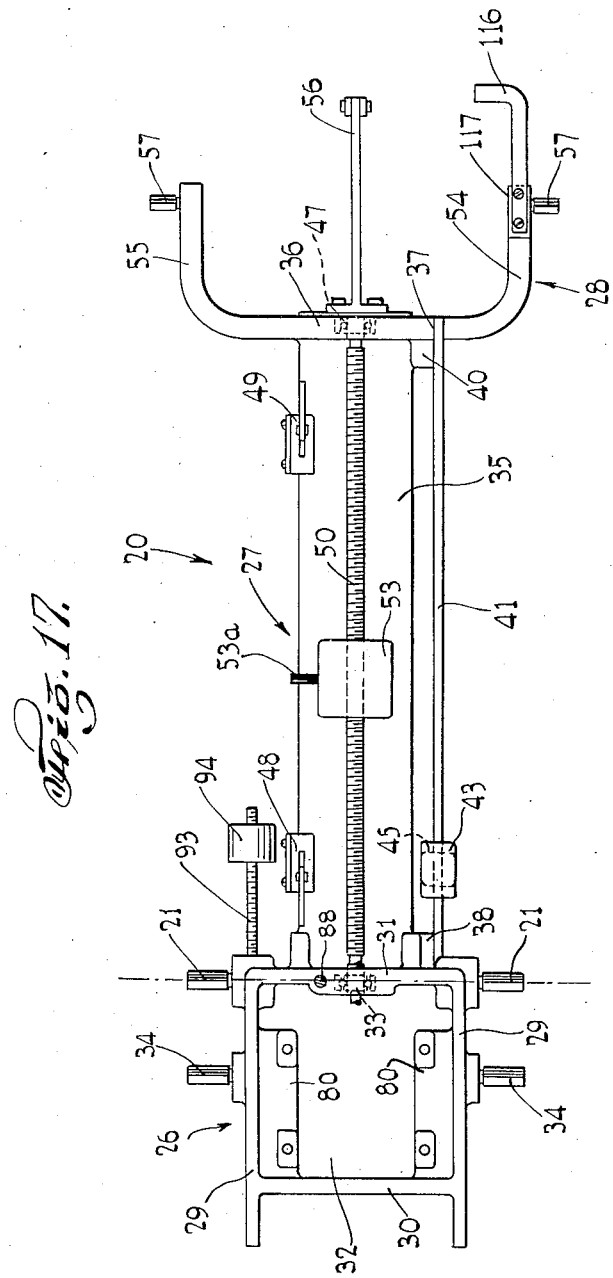
INVENTOR.
BENJAMIN COOPER
BY
J.B. Feldshin
ATTORNEY Patented Jan. 1, 1946

2,392,023

UNITED STATES PATENT OFFICE 2,392,023

AUTOMATIC WEIGHING SCALE

Benjamin Cooper, Netcong, N. J.

Application March 13, 1942, Serial No. 434,532

40 Claims. (Cl. 265—7)

This invention relates to automatic weighing scales. It is particularly directed to a scale for automatically weighing, and remotely recording, positive and negative forces applied thereto.

An object of this invention is to provide a scale of the character described, having an automatically traveling poise to balance the load applied to said scale, and electromagnetic means coupled thereto to operate a remote recorder to record the weight of said load as represented by the position of said poise.

A further object of this invention is to provide in a scale of the character described, a multi-unit weight device for automatically increasing or decreasing the capacity of the scale, depending upon the load applied thereto, said multi-unit weight device being operative for a positive or negative capacity of said scale.

Another object of this invention is to provide in a scale of the character described, means to control the operation of the unit weight device by the operation of the traveling poise.

A further object of this invention is to provide in a scale of the character described, means to operate the unit weight device at different speeds depending upon the loaded condition of said scale.

Still a further object of this invention is to provide in a scale of the character described, means for automatically integrating the weight as represented by the position of the poise and the capacity of the beam as increased or decreased by the operation of the unit weight control, to give the total weight of the load applied thereto, and means for remotely recording the resultant weight.

Still another object of this invention is to provide in a scale of the character described, means to prevent the operation of said scale when the ultimate positive or negative capacity of the scale has been reached.

Yet another object of this invention is to provide in a scale of the character described, means to brake the motor controlling the unit weight devices so that said motor is always returned to a definite zero position after a cycle of operation.

Yet a further object of this invention is to provide a highly improved, compact and rugged scale of the character described which shall be easy to operate, and positive in action, which shall have a large variety of applications and yet be practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawings, in which one of the various possible illustrative embodiments of this invention is shown, Fig. 1 shows a front elevation of an automatic beam scale embodying this invention;

Fig. 2 is a side elevation of Fig. 1;

Fig. 2a is a cross-sectional view taken along line 2a—2a of Fig. 2;

Fig. 3 is a cross-sectional view taken along line 3—3 of Fig. 1;

Fig. 3a is an elevational view with parts broken away, of a bearing support, for the beam of the scale;

Fig. 4 is an enlarged view, partly in front elevation and partly in vertical section, of the load end of a scale beam embodying the invention;

Fig. 5 is a cross-sectional view taken along line 5—5 of Fig. 4;

Fig. 11 is a cross-sectional view taken along line 11—11 of Fig. 9;

Fig. 11a is a cross-sectional view showing the details of a friction clutch of Fig. 11;

Fig. 12 is a cross-sectional view taken along line 12—12 of Fig. 10;

Fig. 12a is a cross-sectional view taken along line 12a—12a of Fig. 12;

Fig. 12b is a cross-sectional view taken along line 12b—12b of Fig. 12;

Fig. 13 is a cross-sectional view taken along line 13—13 of Fig. 9;

Fig. 14 is a wiring diagram showing the circuit connections for said scale beam;

Fig. 15 shows a detailed elevational view of the cams controlling the unit weights;

Figure 6:
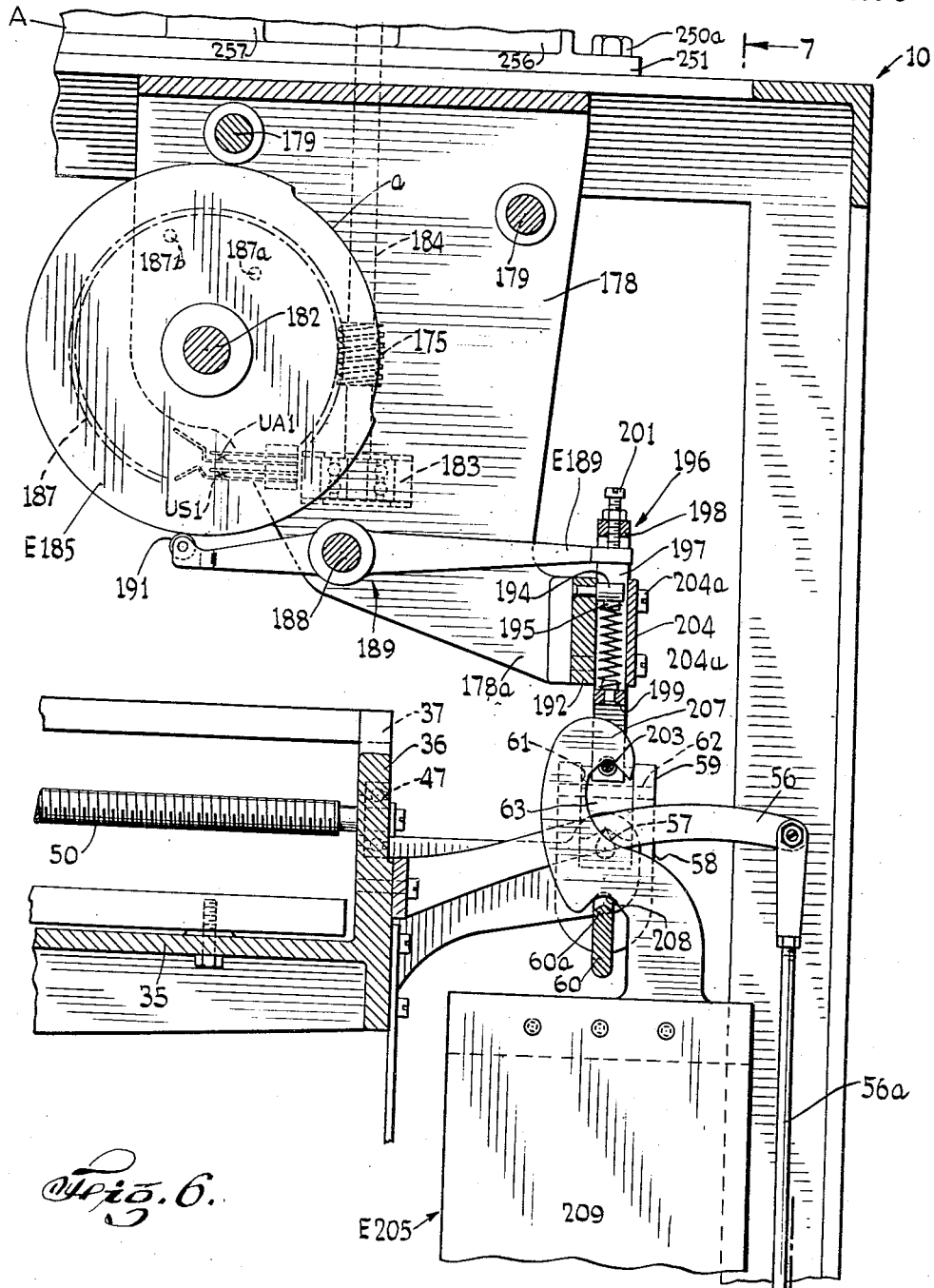
Fig. 6 is an enlarged view, partly in front elevation and partly in vertical cross-section, of the balancing end of a scale beam and the unit weights cooperating therewith.

Fig. 16 comprises two tables, Table A and Table B, showing the increase and decrease, respectively of the scale beam by the action of the unit weights; and Fig. 17 is a top plan view of the scale beam.

Referring now in detail to the drawings, 8 designates a scale embodying the invention. The same comprises a scale cabinet 10, the front, back and a side panel being removed from the cabinet frame, to disclose the interior (Fig. 1). Fixed to the outside of the top wall 10a of said cabinet is a smaller cabinet A, housing automatic and integrating devices as disclosed in Figs. 8 through 13, inclusive. The contents of the cabinet A and operation thereof will be hereinafter described.

Interconnecting the front vertical frame members 10b of cabinet 10, is a horizontal angle shaped member 11. Interconnecting the rear vertical frame members 10c of the cabinet, is another horizontal member 11, aligned with the first member 11. Fixed to both members 11, and spaced apart to form two platforms, are two, flat, horizontal plates 12 and 13, parallel to the sides of the cabinet. Fastened to plate 12, as by bolts 14, is a yoke shaped member 15, terminating in two vertical upstanding arms 16. Each of the arms 16 is bifurcated at its end forming aligned slots 17. Fixed within slots 17, as by pins 18, are bearings 19.

Supported in the bearings 19 is a scale beam 20, having two horizontally aligned, depending knife blades 21 resting in said bearings. Knife blades 21 are beveled at their outer edges to form a point 21a with the knife edge thereof. Fixed vertically across each slot 17, of the arms 16, is a flat plate 22 fixed to said arms by screws 22a. Threaded through a central opening of each plate 22 is a set screw 23 provided with a lock nut 24. The center lines of screws 23 are in a horizontal plane forming a straight line with the knife edges of the blades 21. Lateral play of the scale beam 20 may be adjusted to a proper proportion by turning the set screws 23, and locking the same in place by the lock nuts 24. Fixed to the ends of arms 16 and over the slots 17 are cover plates 25 to protect the bearings 19 and knife blades 21 from dust and grime.

Scale beam 20 comprises a loading end 26, a scale portion 27, and a balancing end 28. Loading end 26 comprises two parallel, vertical, side walls 29, a vertical end wall 30, and a vertical wall 31, dividing said loading end from the scale portion 27.

Threaded in the upper edge of wall 31 is a perpendicular threaded rod 88, the center line of which is in the vertical plane of the edges of knife blades 21. Threaded on said rod is a stability ball 89, its function and use being old in the art. Threaded in the face of wall 31, adjacent scale portion 27, is a horizontal, threaded rod 93. Threaded on said rod is a sensitivity poise 94 for preadjusting the exact balance of scale beam 20.

Walls 29, 30 and 31 form a rectangular opening 32. Fixed in the central portion of wall 31, is a ball bearing 33. Fixed to the outer surfaces of walls 29, are two load knife blades 34, the edges of which are in horizontal alignment. Knife blades 34 are beveled upwardly and inwardly, forming upper edges for the purpose hereinafter appearing.

The scale portion 27 comprises an inverted U-shaped, horizontal member 35, integral with wall 31, and terminating in a vertical wall 36 parallel to the wall 31, formed with a vertical ledge 37 (Fig. 6).

Fixed to the member 35, adjacent wall 31, is a normally open limit switch 48; and adjacent wall 36 is another normally open limit switch 49. Fixed in the central portion of said wall is a ball bearing 47 in horizontal alignment with the bearing 33 in wall 31. Integral with wall 31, and facing the wall 36 are two bosses 38 and 39. Boss 38 is in horizontal alignment with ledge 37, and boss 39 being in alignment with a similar boss 40, integral with wall 36. Fixed to boss 38 and ledge 37 is a tare beam 41, formed with notches 42, and provided with a sliding capacity poise 43. Fixed to bosses 39 and 40 is another tare beam 44, formed with scale markings 44a, and provided with a sliding fractional capacity poise 45. The sliding poises 43 and 45 are provided with thumb screws 46 to fix said poises on said scales to balance the scale in zero position.

Journalled in bearing 47 and through bearing 33 is a horizontal, threaded rod 50. Fixed to walls 31 and 36, near the top edges thereof, is a horizontal guide 51, in perpendicular alignment with the threaded rod 50 (Fig. 3). Fixed to said walls and to the top face of the inverted U-shaped member 35 is a second horizontal guide rod 52 in alignment with guide 51 and rod 50. Threaded on rod 50 is a traveling poise 53, provided with rearwardly extending, insulated arm 53a and with keyways 53b in its upper and lower faces fitting over the guide rods 51 and 52. Arm 53a is adapted to engage the limit switches 48 and 49, to close the same when poise 53 nears the ends of its travel on rod 50, for the purpose hereinafter appearing. The zero or initial position of poise 53 is at the left hand side of beam 20 (Fig. 1) with arm 53a closing switch 48.

Balancing end 28 comprises two outspread, extending arms 54 and 55, integral with the wall 36, and a slightly upwardly extending, damper supporting arm 56, fixed to said wall, and extending beyond the ends of arms 54 and 55. Connected to arm 56 is a damper rod 56a. Fixed into the outer surfaces of arms 54 and 55, and near the outer edges thereof, are two tip knife blades 57, beveled in the same manner as blades 34 and 21. The edges of knife blades 57, 34 and 21 are in the same horizontal plane (Figs. 1 and 17).

Fixed to the lower portion of vertical wall 36, is a depending, angular shaped member 120 having a horizontal arm 121. (Fig. 1). Fixed to the horizontal plate 13, as by bolts 13a, is an upright support 122 having pivoted thereto a forked lever 123, adapted to engage the horizontal arm 121 to hold the beam 20 against movement. Lever 123 is connected by a lever system 124 to a handle (not shown) mounted on the front of cabinet 10, whereby said forked lever may be rotated in a counterclockwise direction, to release arm 121, as shown in Fig. 1. Fixed to support 122 is an adjustable upward stop 125 and an adjustable downward stop 126, adapted to be engaged by arm 121, to limit the movement of beam 20 upon upsetting the same in the respective directions.

Supported on knife blades 57 is a U-shaped member 58, having upstanding bifurcated arms 59 and a notched horizontal arm 60. Bifurcated arms 59 are formed with notches 61 in which are fixed, as by pins 62, caps 63. Fitted in said caps and resting on the tip knife blades to carry the weight of member 58, are inverted bearings 64. Each bearing 64 has a short stem 64a projecting into opening 63a in cap 63. Fixed to each of the arms 59, and across the notch 61, is a small plate 66, carrying an aligning set screw 67 and a locking nut 68, similar to screw 23 and nut 24 for the fulcrum knife blades 21. It will now be understood that knife blades 57 engage inverted bearings 64.

Supported on the load knife blades 34 is a loading yoke 70, having bifurcated arms 71 formed with notches 72. Fixed in each notch 72, as by a pin 73, is a cap 74. Fixed to said cap is an inverted bearing 75, resting on said knife blades and supporting said yoke. Fixed to arms 71, across the notches 72, are small plates 77 bearing aligning screws and nuts 78, similar to that used on the fulcrum knife blades 21, and for a similar purpose. Fixed to the center point of yoke 70 is a load yard 76, connected to the loading platform of said scale (not shown), or to some other means upon which a weight may act, either as a positive or negative force (up force or down force).

Means is provided to rotate the threaded rod 50 to move the traveling poise 53 on said rod to offset the load applied to the beam 20 whenever a weight acts upon the loading yard 76.

To this end, there is provided in the rectangular opening 32, and integral with walls 29 and 30, two horizontal bosses 80. Fixed to the upper surface of said bosses, as by bolts 81, is an electric motor BM, having a horizontal drive shaft 83. Fixed to the outer end of said shaft is a pinion 84. Fixed to the end of threaded rod 50, and within the rectangular opening 32, is a spur gear 85, to which is affixed, as by screws 86, a larger spur gear 87, meshing with the pinion 84.

For the purposes hereinafter appearing, there is fixed to the underside of bosses 80, by the bolts 81, a synchronous transmitter BS, which is part of a synchronous transmitter, receiver set such as sold under the trade name of "Selsyn" or "Autosyn." Transmitter BS has a horizontal driven shaft 90 with a spur gear 92, meshing with the gear 85. Transmitter BS is driven by motor BM, and performs as a three phase generator.

Referring now to Figures 1 and 2, there is fixed to the side of scale cabinet 10, a vertical plate 95, formed with a notch 96. Pivoted to said plate, as by pins 97, are two pairs of normally open switch contact arms 98, 99 and 100, 101. Fixed near the upper and lower edges of plate 95, are two horizontal plates 102 and 103. Threaded in plate 102 is a screw 104, the end of which abuts the contact arm 98; a screw 105, the end of which abuts contact arm 99; and a screw 106 interconnected to contact arm 99 by a coil tension spring 107. Threaded in plate 103 is a screw 110, the end of which abuts contact arm 100; a screw 111, the end of which abuts contact arm 101; and a screw 112 interconnected by a coil tension spring 113 to contact arm 100. Contact arms 98 and 101 are connected to plate 95 by springs 114 and 115, respectively.

Fixed to the end of arm 54 of the beam 20, and insulated therefrom by insulation 117, is a contact arm 116 (Fig. 17), extending beyond the end of said arm and through the notch 96 in plate 95 (Fig. 2). Contact arm 116 is normally midway between the contact arms 99 and 100 when scale beam 20 is in balanced position. By adjustment of screws 105 and 110, the contacts 99 and 100 may be adjusted against the tension of springs 107 and 113, respectively, so that contact arm 116 is midway between said contacts. Adjustment of screws 104 and 111 against the action of springs 114 and 115, respectively, will adjust contacts 98 and 101, so that contacts 98, 99 and 100, 101 are open when contact arm 116 is in its normal position.

Thus, if contact arm 116 were moved upwardly a short distance by a slight unbalance of scale beam 20, said contact and contact 99 would close. If contact 116 were moved upwardly a greater distance, contacts 116, 99 and 98 would close. Similarly, if contact 116 were moved downwardly a short distance, contacts 116 and 100 would close, while contacts 116, 100 and 101 will close for a greater degree of movement. In all cases, when contact 116 is returned to initial position by the balance of scale beam 20, springs 107, 113, 114 and 115 will return their respective contacts to initial condition.

Means is provided to automatically increase or decrease the capacity of scale beam 20 by adding to, or taking away from horizontal bar 60 on said beam unit weights of different values.

Figure 7:
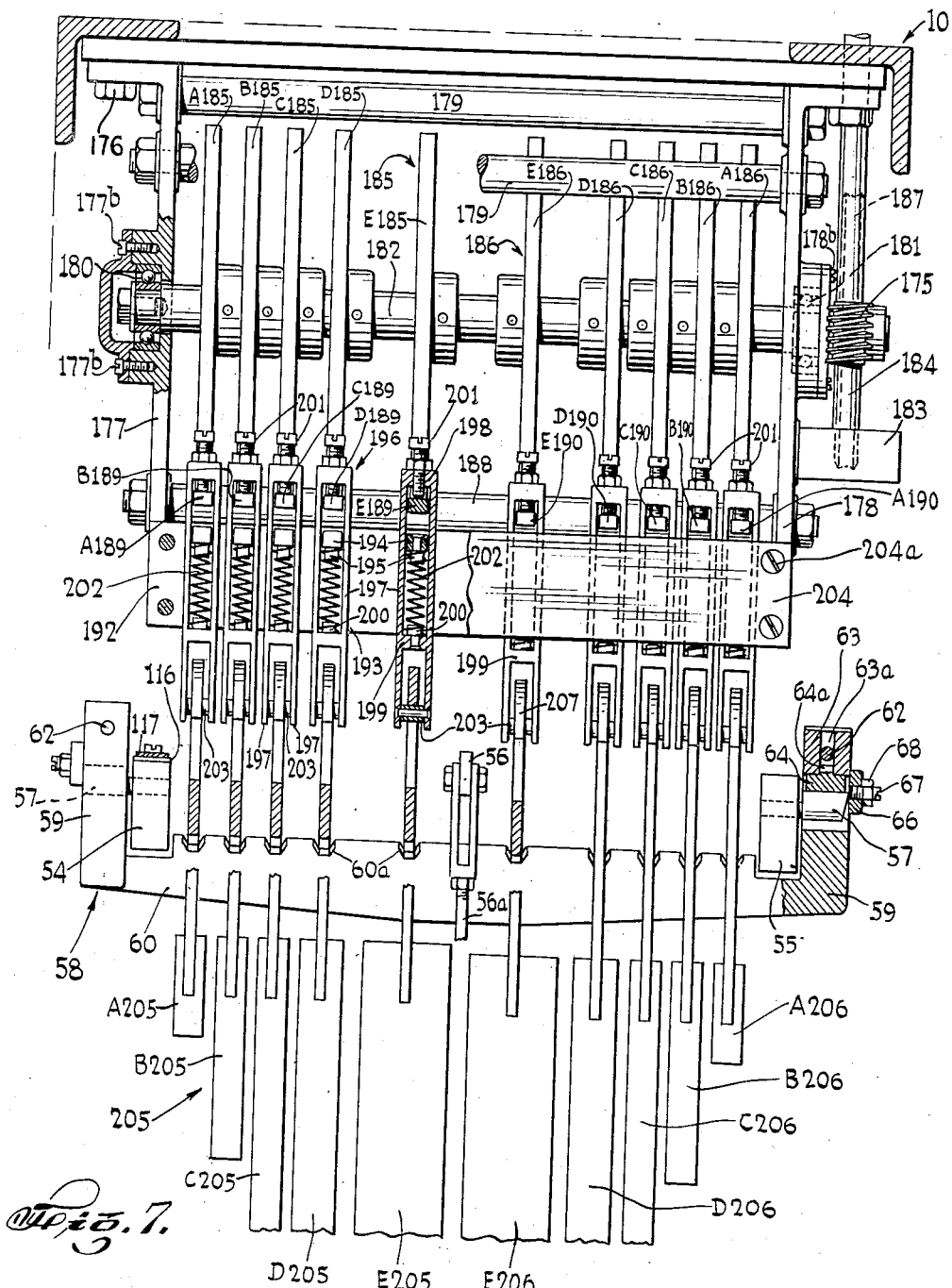
Fig. 7 is a view taken along line 7—7 of Fig. 6.

To this end, there is fixed, inside cabinet 10, to the top wall thereof, as by bolts 176, two parallel, depending plates 177 and 178, spaced apart and made rigid by spacer rods 179, and provided with projecting portions 177a and 178a, respectively (Figs. 2, 6 and 7). Fixed in plate 177, as by screws 177b, is a ball bearing 180. Fixed in plate 178, as by screws 178b, is a second ball bearing 181, in horizontal alignment with bearing 180. Journaled in bearing 180 and through bearing 181 is a horizontal shaft 182. Fixed to an end of said shaft, adjacent bearing 181 is a worm gear 187 provided with two insulated studs 187a and 187b. Stud 187a is placed at a point 25° from the vertical center line of said gear in a counterclockwise direction; while stud 187b is fixed an equal angular distance from said center in a clockwise direction. Fixed to the outer surface of plate 178, in any suitable manner, are normally closed switches UA1 and US1. Switch UA1 is adapted to be opened upon 155° rotation of gear 187 in a clockwise direction (Fig. 6) by stud 187b, and switch US1 is adapted to be opened by a stud 187a upon rotation of gear 187 through an angle of 155° in a counterclockwise direction.

Fixed to the outside surface of plate 178 is a bearing 183 carrying a vertical shaft 184 which extends upwardly through the top of scale cabinet 10. For the purpose hereinafter appearing, there is fixed to said shaft, a worm 175 meshing with the worm gear 187 on shaft 182.

Fixed to said shaft, between plates 177 and 178, is a set of "plus" cams 185, comprising cams A185, B185, C185, D185, and E185; and a set of "minus" cams 186, comprising cams A186, B186, C186, D186, and E186. Each of said cams is in perpendicular alignment with a notch 60a of bar 60. Each of said cams is formed with one or more notches, as will appear in detail hereinafter.

Fixed in plates 177 and 178, and parallel to shaft 182, is a shaft 188. Independently and rotatably mounted on said shaft, are two similar sets of cam levers 189 and 190, in the planes of cam sets 185 and 186, respectively, and adapted to coact therewith. Levers 189, 190 are provided with aligned cam followers 191 at adjacent ends, adapted to ride over the peripheries of their respective cams. The levers of set 189 have rearwardly extending arms A189, B189, C189, D189 and E189. Levers 190 have arms A190, B190, C190, D190 and E190.

Fixed horizontally across the projections 177a and 178a of plates 177 and 178, is a vertical guide plate 192, formed with a plurality of grooves 193, each of said grooves being in the vertical plane of one of the levers 189 or 190. Fixed in each of the grooves 193, near the top edge thereof, is a small block 194 provided with a depending stud 195. Slidably received in each of said grooves, and supported by a corresponding arm A189, A190, etc., is a hanger 196. Each of said hangers comprises two parallel, vertical side walls 197, a top wall 198, and a wall 199, fixed across said side walls near the lower central portions thereof. On each wall 199 is a stud 200 perpendicularly aligned with stud 195. It will be understood that each block 194 is within one of the hangers 196. Top walls 198 have threaded therein screws 201, the lower ends of which abut the arms of levers 189 or 190, thus suspending said hangers 196 in the grooves 193.

Fitted over studs 194 and 200, and between walls 197 of each hanger 196, is a coil compression spring 202, tending to move said hanger in a downward direction (Fig. 7). Fixed across side walls 197, of said hangers, near the lower edges thereof, are concentric, horizontal pins 203. Fixed to guide 192 as by screws 204a, is a vertical plate 204, forming a cover for the grooves 193 in said guide.

For the purpose hereinafter appearing, there is suspended from bar 60, a set of "plus" unit weights 205, comprising weights A205, B205, C205, D205 and E205. Suspended from pins 203 of the hangers 196, is a set of "minus" unit weights 206 comprising weights A206, B206, C206, D206 and E206. Each of said unit weights comprises a top hook 207, adapted to be hooked over pins 203, a hook 208, in alignment with a notch 60a and adapted to be hooked over bar 60, and a weight portion 209 (Fig. 6).

It will be noted that in suspending sets of unit weights 205 and 206 from the pins 203, hangers 196 are pulled downwardly thereby, to rotate sets of levers 189, 190 in a clockwise direction about shaft 188 (Fig. 6), thus holding cam followers 191 against the peripheries of their respective cams and sets of cams 185 and 186.

Referring now to Fig. 15, there is disclosed a detailed view of the set of "plus" cams 185 and the set of the "minus" cams 186. All of the cams have zero points at the bottom. Cam A185 is formed with sixteen notches $a, b, c, d, e, f, g, h, k, m, n, p, q, r, s$ and $t$; notch $a$ being 5° in a counterclockwise direction from the zero position, notches $b, c$, etc., are thereafter spaced 10° apart, center to center, the notch $t$ being 155° in a counterclockwise direction from said zero position.

Cam B185 is formed with eight notches $a, b, c, d, e, f, g$ and $h$, each notch being 5° in extent; notch $a$ beginning 10° in a counterclockwise direction from the zero position, notch $b, c$, etc., are thereafter spaced apart 15° between adjacent notches. Notch $h$ of cam B185 extends from 150° in a counterclockwise direction from the zero position.

Cam C185 is formed with four 15° notches $a, b, c,$ and $d$; notch $a$ starting at a point 20° in a counterclockwise direction from the zero position and notches $b, c,$ and $d$ being thereafter spaced apart 25° between adjacent notches. Notch $d$ begins at a point 140° and ends at a point 155° in a counterclockwise direction from the zero point.

Cam D185 is formed with two 35° notches $a$ and $b$; notch $a$ beginning at a point 40° in a counterclockwise direction from the zero position. Notch $b$ begins at a point 120° and ends at a point 155° in a counterclockwise direction from the zero position.

Cam E185 is formed with a 75° notch $a$ beginning at a point 80° and ending at a point 155° in a counterclockwise direction from the zero position.

The "minus" cam A186 is formed with 16 notches to form 16 projections, $a, b, c, d, e, f, g, h, k, m, n, p, q, r, s$ and $t$; the projection $a$ being at a point 5° from the zero position in a clockwise direction; and projections $b, c$, etc., being spaced thereafter at 10° intervals between centerlines of the projections. The last projection $t$ begins at a point 155° and ends at a point somewhat less than 205° in a clockwise direction from the zero position, to form a notch $v$ between said projection $t$ and projection $a$ of 155°.

Cam B186 is formed with eight notches to form eight 5° projections $a, b, c, d, e, f, g, h$; projection $a$ being spaced 10° in a clockwise direction from a zero position. The projections $b, c$, etc. are spaced 15° apart between adjacent projections; projection $h$ beginning at a point 150° and ending at a point somewhat less than 205° from the zero position in a clockwise direction to form a notch $v$ of 160°.

Cam C186 is formed with four notches to form four 15° projections $a, b, c$ and $d$. Projection $a$ begins at a point 20° from the zero position, while projections $b, c$ and $d$ are spaced thereafter at 25° intervals between adjacent projections. Projection $d$ begins at a point 140° and ends at a point somewhat less than 205° in a clockwise direction from the zero position. Notch $v$ of said cam therefore extends 175°.

Cam D186 is formed with two notches to form two projections $a$ and $b$. Projection $a$ begins at a point 40° and ends at a point 75° in a clockwise direction from the zero position. Projection $b$ begins at a point 120° and ends at a point about 205° in a clockwise direction from the zero position, leaving notch $v$ extending a distance of 195°.

Cam E186 is formed with a projection $a$, beginning at a point 80° and ending at a point somewhat less than 205° in a clockwise direction from the zero position, and a notch $v$ extending for a distance of 235°.

It is to be noted that the notches $v$ of the "minus" cams 186 all begin at a point somewhat less than 205° from the zero position in a clockwise direction. Thus, said notches are coextensive with the working portion of the "plus" cams 185 which extend for 155° in a counterclockwise direction. Similarly, the inoperative portion of cams 185 is coextensive with the working portion of the "minus" cams 186.

By rotating shaft 182, in the manner to be hereinafter described, the cams 185, and 186 will operate the cam levers 189 and 190, respectively, to add or take off from the horizontal cross bar 60 their respective unit weights 205, 206. By rotating shaft 182 in a clockwise direction, the levers 190 will remain in notches $v$ keeping the "minus" unit weights 206 on the cross bar 60. Levers 189 will coact with their respective cams to drop the "plus" unit weights 205 on bar 60.

It will be noted that the set of unit weights 206 are normally hung on the cross bar 60, and these unit weights balance the beam at zero. In the zero positions of the cams, therefore, the set of weights 206 are imposed upon the beam, whereas, the set of weights 205 are off the beam, balancing the beam. When any of the unit weights of the set 205 is hung on the cross bar 60, a plus weight is applied to the beam equivalent to the value of the particular unit weight. When one of the unit weights 206 is lifted off the cross bar 60, the capacity of the beam is decreased by an equivalent weight. For this reason, the weights 206 are minus weights, whereas, the weights 205 are plus weights.

As the shaft 182 is rotated in a clockwise direction, the minus weights remain on the beam, and the plus weights are selectively applied to the beam, depending upon the extent of the notches in the various cams. As the shaft 182 is rotated in a counterclockwise direction from zero, the plus unit weights 205 remain off the beam, and the minus unit weights 206 are selectively withdrawn from the beam, depending upon the position and extent of the projections of the cams 186.

Let us assume that the cams 205 and 206 have been rotated through an angle of 15° in a clockwise direction. As cam A185 reaches the point 5°, follower 191 of lever 189 associated with said cam, will fall into notch a of said cam, causing said lever to be rotated in a clockwise direction about shaft 188 (Figs. 1 and 6). Arm A189 of said lever will thus be moved downwardly to deposit the unit weight A205 on the cross bar 60 to impose said unit weight on the beam 20 of the scale. As cam A185 continues to rotate through an additional 5° angle, follower 191 leaves notch a of said cam, and its lever 189 is thus rotated in a counterclockwise direction to lift unit weight A205 from bar 60 and withdraw said unit weight from the beam. At the same time, cam B185 has been rotated, permitting the follower 191 of the arm B189 to fall in notch a of said cam, thus depositing unit weight B205 on cross bar 60. When shaft 182 has been rotated through an angle of 15°, notch b of cam A185 has been reached by follower 191, to again deposit unit weight A205 on said bar. The notch a of cam B185 being 5° in width will permit unit weight B205 to remain on bar 60. Thus, at a point 15° from the zero position, unit weights A205 and B205 have been deposited on bar 60 together with the "minus" unit weights 206 which have remained on bar 60.

Assuming that the capacity of beam 20 without the plus and minus unit weights is 250 pounds and designating the value of the unit weights A205, B205, C205, D205 and E205, for the purpose of illustration, as being 250 pounds, 500 pounds, 1000 pounds, 2000 pounds and 4000 pounds, respectively, table A of Fig. 16 shows the increase of the capacity of beam 20 during the revolution of the "plus" cams 185 through 155° in a clockwise direction, in which position a total of 8000 pounds may be weighed on the scale (including the 250 pounds on the poise).

Should shaft 182 be rotated in a counterclockwise direction (Fig. 6), the "minus" cams 186 are rotated to lift off their respective minus unit weights 206 from bar 60. In the case of said minus cams the projections on said cams will rotate levers 190 in a counterclockwise direction (Fig. 6) about shaft 188 to lift the weights 206 from said bar to balance a downward pull on the load yard 76 of the beam. Designating the value of weights A206, B206, C206, D206 and E206, for the purpose of illustration, as being 250 pounds, 500 pounds, 1000 pounds, 2000 pounds and 4000 pounds, respectively, table B of Fig. 16 shows the "minus" capacity of beam 20 when shaft 182 is rotated in a counterclockwise direction for 155°, which in the case illustrated, is 7,750 pounds.

It is to be noted that when shaft 182 is rotated through an angle of 155° in a clockwise direction from the zero position, all "plus" unit weights 205 are on bar 60 and stud 187b on gear 187 will open switch UA1. When shaft 182 is rotated through an angle of 155° in a counterclockwise direction from the zero position, all "minus" unit weights have been lifted off the bar 60 and stud 187a opens switch US1.

*The unit weight control mechanism*

Within cabinet A, and fixed to the top of scale cabinet 10, as by bolts 250a, (Figs. 8, 9 and 11) is a support 250 formed with a bottom wall 251, an upright side wall 252, and an upright rear wall 253. Fixed to rear wall 253, and spaced apart therefrom, as by spacer lugs 254, is a vertical wall 255 parallel to wall 253. Bottom wall 251 is formed at one end with a boss 256, and at its central portion with a boss 257. Fixed across the top edges of walls 253 and 255 is a horizontal plate 258 extending slightly beyond the inner face of rear wall 253. Fixed to the rear surface of wall 255 is a bearing 259, (Fig. 13) having an axis parallel to said wall, and aligned with bearing 183 on plate 178 within the scale cabinet 10, and receiving therein the end of the vertical shaft 184 (Fig. 7).

Fixed to boss 256, as by screws 256a, is an electric motor UWM, hereinafter called the unit weight motor, having a horizontal drive shaft 260. Fixed to boss 257, as by screws 257a, is a reduction gear box 261, having an input shaft 262 coupled with motor shaft 260, and an output shaft 263, at right angles to the input shaft. The end of the output shaft is journalled in a ball bearing 264 in rear wall 253. Fixed on shaft 263, adjacent wall 253, is a gear 283.

Fixed in wall 253, and in perpendicular alignment with bearing 264, is a second ball bearing 265. Fixed in wall 255, and in horizontal alignment with the bearing 265 is a ball bearing 266. Journaled in bearings 265 and 266 is a horizontal shaft 267. For the purpose hereinafter appearing, there is fixed to shaft 267, between the walls 253 and 255, a gear 268, and a larger gear 269.

Referring to Figs. 11 and 11a, there is fixed to the shaft 267 adjacent the front surface of rear wall 253, a sleeve 270 carrying collar 271 fixed thereto adjacent bearing 265, and an enlarged disc portion 272 likewise fixed thereto and formed with extending lugs 273. Rotatably mounted on sleeve 270, between the portions 271 and 272 thereof, is a clutch gear 274 meshing with the gear 283, and formed with an annular tapering recess 275. Slidably and rotatably mounted on the end of shaft 267 is a clutch cone 276, adapted to fit into and frictionally engage the surfaces of the recess 275. Said cone is formed with through openings 277 receiving lugs 273, and provided with an elongated, threaded hub portion 278. Rotatably mounted about the hub portion 278, and held thereon by a nut 279, is a thrust bearing 280 and a disc 281 provided with two radial pins 282.

When the motor UWM is operated, shaft 263 is rotated through the reduction gear box 261, rotating the gear 283. Gear 283 thus rotates clutch gear 274, but as said clutch gear is free to rotate about sleeve 270, shaft 267 will not be rotated.

Means is provided to shift clutch cone 276 into engagement with the surface of recess 275. To this end, there is fixed to the upper surface of the horizontal plate 258, as by screws 258a, an electromagnet 285, provided with a magnetizing coil 284, a core 286, and a bell crank shaped armature 287, pivoted as at 287a. Armature 287 is formed with an arm 288 provided with an insulated pin 289. For the purpose hereinafter appearing, there is fixed to plate 258, and insulated therefrom, and from each other, two pairs of normally open contact fingers 290, 291 and 292, 293 (Fig. 10). Finger 293 is engaged by insulated pin 289, and is connected to finger 291 by an insulated stud 294. When electromagnet 285 is energized in the manner hereinafter described, armature 287 will be rotated in a counterclockwise direction (Figs. 9 and 10), moving the pin 289 upwardly to close the fingers 290, 291 and 292, 293. Upon deenergizing said electromagnet, fingers 290, 291 and 292, 293 will again open. There is also fixed to said plate, and insulated therefrom and from each other, two pair of contact fingers 390, 391 and 392, 393. Fingers 390, 391 are normally closed, while fingers 392, 393 are normally open. Fingers 390 and 393 are interconnected by an insulated stud 390a. As will hereinafter appear, finger 393 is adapted to be engaged by an insulated stud 393a on armature 287 when electromagnet 285 is energized, to open fingers 390, 391 and close fingers 392, 393. Spring fingers 390, 391, 392 and 393 are so fixed to plate 258, that pin 393a will engage finger 393 only close to the limit of the counterclockwise rotation of armature 287, when electromagnet 285 is energized and remains energized.

Figure 8:
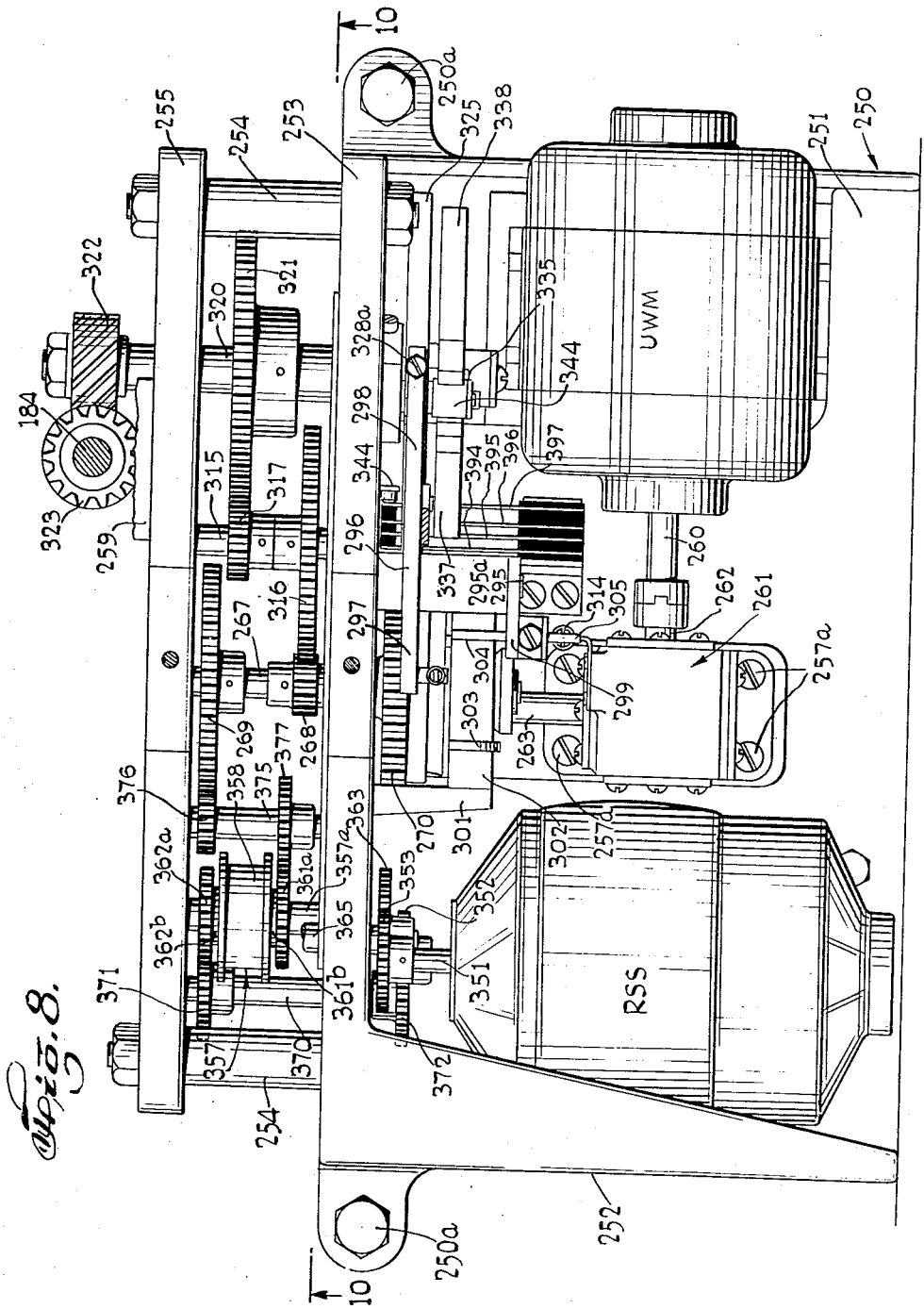
Fig. 8 is a plan view, with a portion broken away, of a unit weight control and differential mechanism.
Figure 9:
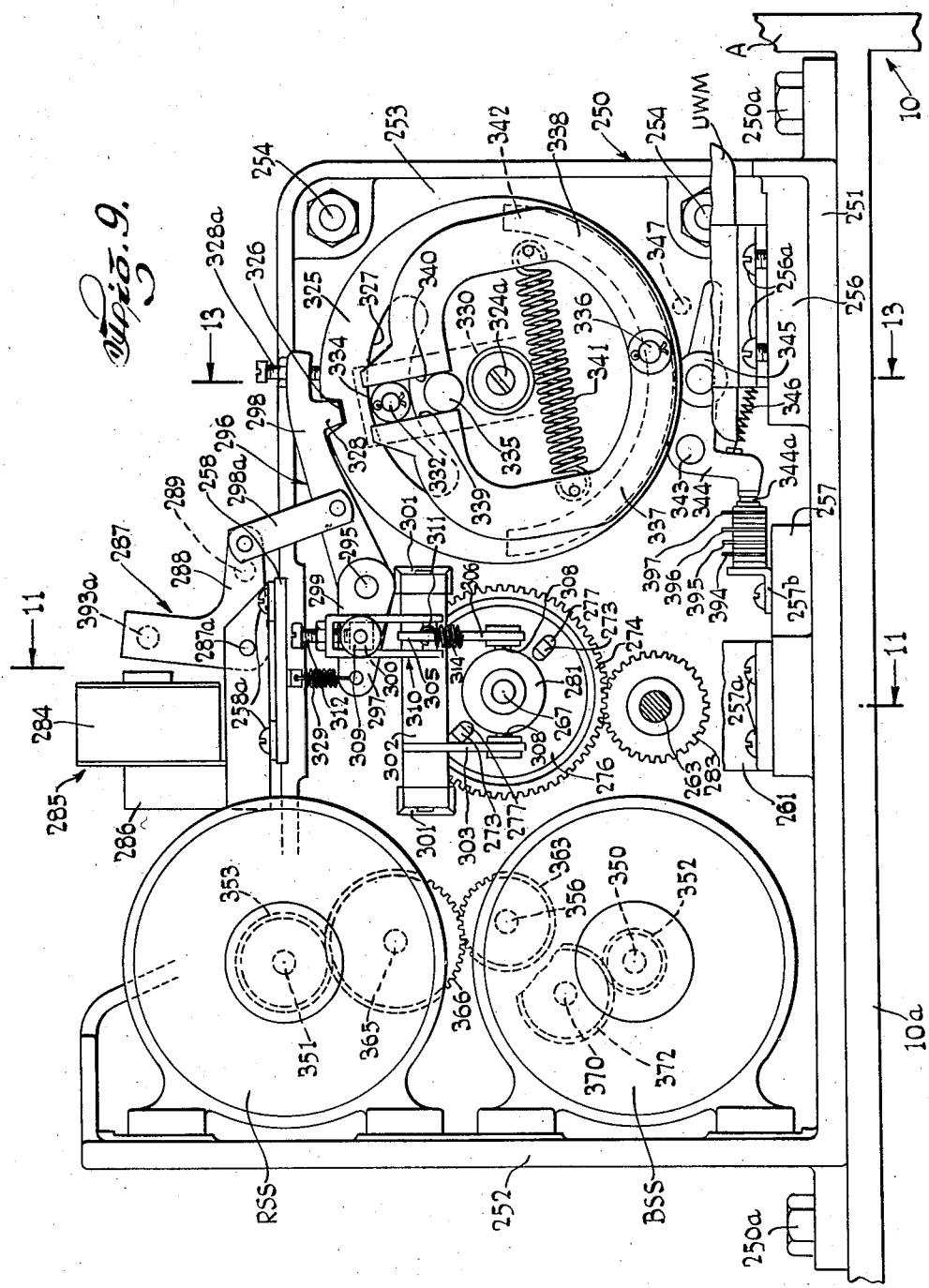
Fig. 9 is a front elevational view, with a portion broken away, of Fig. 8.
Figure 10:
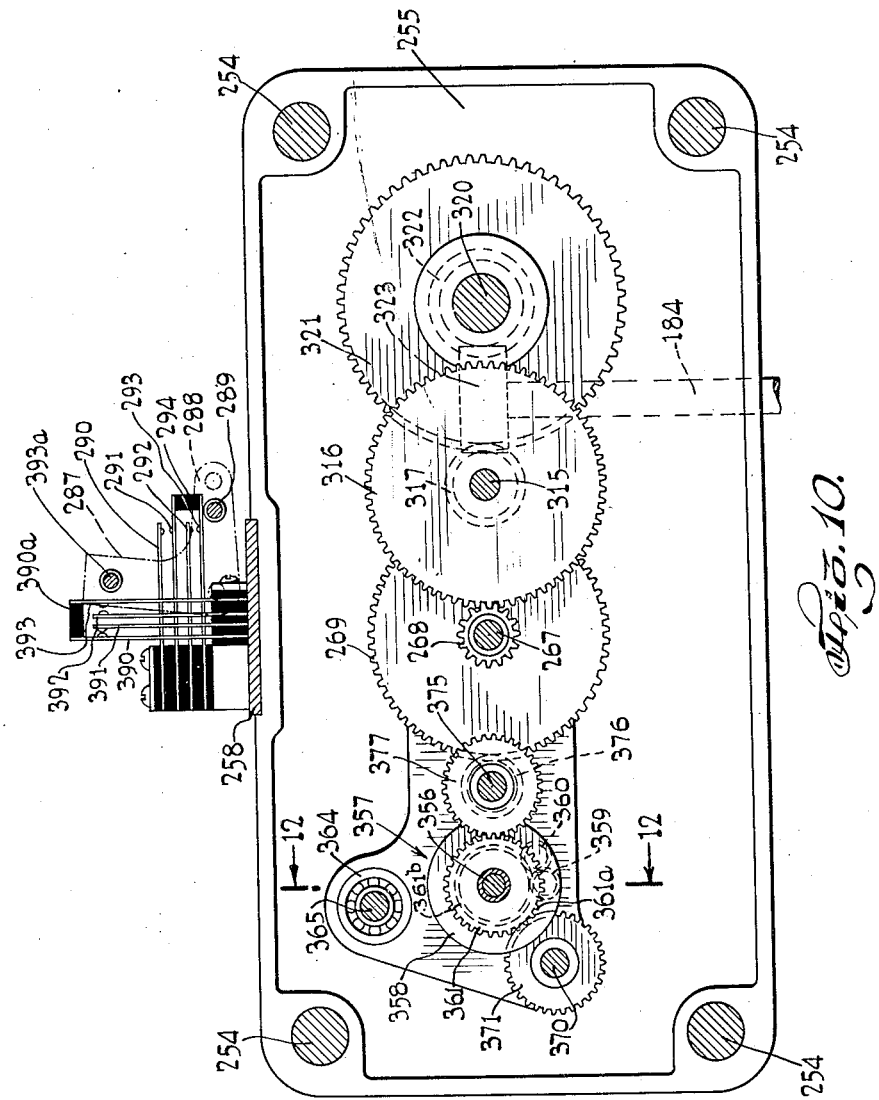
Fig. 10 is a cross-sectional view taken along line 10—10 of Fig. 8.

Fixed to the rear wall 253, below plate 258 is a forwardly extending, horizontal shaft 295 (Figs. 8 and 9). Rotatably mounted on said shaft is a sleeve 295a. Fixed to said sleeve, adjacent wall 253 is a lever 296 having arms 297 and 298, the purpose of which will hereinafter be described; and an arm 299 fixed to its outer end. Interconnecting arm 298 and arm 288 of the armature 287 is a link 298a. Fixed to the end of arm 299 is a square stud pin 300.

Fixed to rear wall 253, and below shaft 295, are two forwardly extending arms 301. Journaled in the ends of arms 301 is a horizontal shaft 302 having fixed thereto a depending arm 303 and a bell crank 304, formed with a forwardly extending arm 305 and a depending arm 306. Arms 303 and 306 are formed at their lower edges with slots 307. Fixed in said slots are the blocks 308 having journaled therein the pins 282 of the disc 281. Interconnecting the end of arm 305 with an extension 313 on the reduction gear box 261, is a coil tension spring 314 tending to rotate bell crank 304, and hence shaft 302, in a counterclockwise direction (Fig. 11). Slidably mounted over the square stud 300, and kept thereon by a washer 309, is a yoke shaped link member 310, pivoted at its lower end to arm 305 by a pin 311. The effective length of link member 310 may be adjusted by a screw 312 threaded through the top wall thereof and abutting stud 300 (Figs. 9 and 11).

When electromagnet 285 is energized, arm 288 will be moved upwardly, to move link 298a and rotate lever 296 in a counterclockwise direction (Fig. 9). Sleeve 295a is thus rotated, rotating arm 299 and permitting link member 310 to be moved downwardly by the action of spring 314 on arm 305. Bell crank 304 is thus rotated in a counterclockwise direction, rotating therewith shaft 302 and arm 303, causing the blocks 308 and pins 282 to move disc 281 to the right (Fig. 11). The clutch cone 276 engages the surface of annular recess 275. The rotation of shaft 263 is thus transmitted through gears 283 and 274, and through the clutch action of cone 276 and gear 275 to the shaft 267. As will be apparent, the clockwise rotation of bell crank 304 (Fig. 11) will move disc 281 to the left to release the drive of shaft 267.

Referring to Figs. 8, 10 and 13, there is journaled in rear wall 253, and wall 255, a horizontal shaft 315 having fixed thereon a gear 317, and a gear 316 meshing with the gear 268. Fixed in walls 253 and 255 and in horizontal alignment are bearings 318 and 319, respectively, carrying an extended shaft 320. Fixed to said shaft and between the walls 253 and 255 is a gear 321 meshing with gear 317 on shaft 315. Fixed to shaft 320, adjacent the outer surface of wall 255, is a spiral gear 322. Fixed to the vertical shaft 184, extending upwardly from scale cabinet 10, is a spiral gear 323 meshing with gear 322.

Thus, the drive of motor UWM is transmitted to shaft 184 to rotate the unit weight cams in the manner heretofore described.

Means is provided to stop the rotation of shaft 320 exactly at an initial zero position upon energization of the electromagnet 285. To this end, there is fixed to a sleeve 324, rotatable on shaft 320, and in alignment with lever 296, a disc 325 formed with a radial notch 326 in its periphery, and an elongated arcuate slot 327. Arm 298 of lever 296 is formed with a depending lug 328 adapted to ride on the periphery of disc 325 and fall into notch 326 of said disc. A coil tension spring 329, interconnecting arm 297 with plate 258, holds said follower in engagement with the periphery of said disc. The depth to which lug 328 may be dropped into notch 326 may be adjusted by a screw 328a on arm 298, and fixed in adjusted position by a lock nut, so that there is some play between the sides of the notch and cam lug to prevent freezing.

Thus, when electromagnet 285 is energized, lever 296 is rotated counterclockwisely (Fig. 9) in the manner hereinbefore described, lifting lug 328 out of notch 326 and permitting disc 325 and shaft 320 to rotate. Should electromagnet 285 become deenergized during the revolution of disc 325, lug 328 will ride on the periphery of said disc until said lug falls into notch 326 to halt the rotation of said disc. Further, as long as lug 328 rides on disc 325, cone clutch 274, 276 remains engaged to keep shaft 267 rotating so that disc 325 keeps rotating for at least one revolution. When lug 328 drops into notch 326 at the end of such revolution, clutch 274, 276 disengages to release the drive of shaft 267 and hence also the drive of shaft 320. As the gear trains operated by shaft 320 through gears 321 and 322 are rotated at considerable speed, despite the slowing down of motor UWM, as will appear hereinafter, any sudden halt to the rotation of shaft 320 would strip the gears. At the same time, it is very essential that disc 325 is returned to its initial zero position, as will hereinafter become apparent.

Means is therefore provided to gradually decrease the rotation of shaft 320, upon completion of one revolution of disc 325, by permitting said shaft to overrun the disc and then bring it back to an initial zero position. To this end, there is fixed to shaft 320, between wall 253 and disc 325, an arm 330 formed with a lug 331 passing through the arcuate opening 327 of said disc. Fixed to said lug, as by a cotter pin 332 and collar 333, is a roller 334. Fixed in the face of disc 325 and on a radial line with notch 326 is a pin 335. Pivoted to disc 325 on diametrically opposite sides of notch 326, as by cotter pin and stud 336, are two, substantially semi-circular, similar, symmetrical, arms 337 and 338 having opposed straight, parallel faces 339 and 340, respectively. Interconnecting said arms is a heavy coil tension spring 341 tending to pull the faces 339, 340 together, squeezing the pin 335 and roller 334 into alignment with each other and hence with notch 326.

In operation, arm 330 rotates with shaft 320, to which it is fixed, and due to the tension of spring 341 on the arms 337 and 338, a drive connection is had between said arms and roller 334 to rotate disc 325. When follower 328 drops into notch 326 of said disc, shaft 320 will continue to rotate due to the inertia of the gear trains, the motor UWM being stopped, as will appear hereinafter, and shaft 267 being disengaged from the motor drive. Arm 330 thus continues to rotate, prying apart arms 337 and 338 against the action of coil spring 341. The rotation of shaft 320 and the gear trains is thus braked, permitting spring 341 to again force arms 337 and 338 together to bring roller 334, pin 335, and notch 326 in radial alignment. Thus, shaft 320 and its interconnected gear train is effectively rotated through exactly one revolution, being returned each time to its initial zero position.

It will now be understood that disc 325 will make any number of revolutions as long as magnet 285 remains energized, and will stop at the end of the revolution during which said magnet is deenergized, in the manner hereinafter appearing.

Means is provided to slow down the speed of motor UWM toward the end of the revolution of disc 325, at the end of which said disc stops rotating. For this purpose, there is fixed to boss 257, as by a bracket 257b, insulated therefrom and from each other, four contact spring fingers 394, 395, 396 and 397 (Figs. 8, 9 and 14). Spring fingers 394 and 395 are normally closed, while fingers 396 and 397 are normally open. An insulated pin 394a interconnects fingers 394 and 397 to cause simultaneous opening of switch 394, 395 and closing of switch 396, 397.

Fixed to the rear of disc 325, and adapted to be rotated therewith, is a semi-cylindrical cam portion 342 beginning at a point 90° in a clockwise direction from the bottom of a vertical diametric line of disc 325 (Fig. 9) and extending 180° from the point of beginning in a counterclockwise direction around the lower periphery of said disc. Pivoted to rear wall 253, as by pin 343, is a bell crank 344 provided with an arm carrying an insulation button 344a at one end thereof, adapted to engage the spring finger 397. Rotatably mounted on the other arm of bell crank 344 is a roller 345, adapted to ride on the periphery of cam portion 342. A spring 346 interconnects the first arm of said bell crank with rear wall 253, tending to rotate said bell crank in a counterclockwise direction to hold said roller against the periphery of said cam portion, and adapted to move button 344a out of contact from spring finger 397 when roller 344 does not contact cam 342. A stop 347 is mounted in rear wall 253 to limit the counterclockwise rotation of bell crank 344.

When disc 325 is rotated in either direction, in the manner heretofore described, roller 345 engaging the periphery of cam portion 342, will hold bell crank 344 in the position shown in Fig. 9. Button 344a will thus engage finger 397 to close the fingers 396, 397 and open the fingers 394, 395. After a 90° revolution, initial position shown in Fig. 9, roller 345 will slip off the cam portion 342, permitting spring 346 to rotate the bell crank 344 in a counterclockwise direction until said bell crank abuts the stop 347. The counterclockwise rotation of said bell crank will release spring finger 397, permitting fingers 396, 397 to open, and fingers 394, 395 to close. After a further revolution of 180°, roller 345 will again engage the periphery of cam portion 342 to rotate the bell crank in a clockwise direction. Fingers 394, 395 will again be opened and fingers 396, 397 will again be closed while said roller remains on the periphery of said cam portion.

Referring now to Fig. 14 there is disclosed an electrical circuit C interconnecting the beam limit switches 48 and 49, the unit weight limit switches UA1 and US1, the beam contacts 98, 99, 100, 101 and 116, the beam motor BM, and the unit weight motor UWM.

Circuit C comprises a pair of beam relays BA and BS, and an auxiliary beam relay HS, having coils 401, 402 and 403, respectively, a pair of auxiliary beam relays BA1 and BS1, having coils 404 and 405, respectively, a pair of unit weight relays UA and US having coils 406 and 407, respectively, and a pair of beam limit relays LA and LS, having coils 408 and 409, respectively.

Associated with relay BA are two normally opened contact arms 410 and 411 adapted to engage the contacts 413 and 414, respectively upon energizing said relay. Associated with relay BS are two normally opened contact arms 415 and 416 adapted to be moved into engagement with contacts 417 and 418, respectively, upon energizing said relay. Associated with relays BA1 and BS1 are a pair of normally opened contact arms 420, 421, 422 and 423, respectively. Arms 420 and 421 are adapted to engage fixed contacts 424 and 425 upon energizing relay BA1. Arms 422 and 423 are adapted to engage fixed contacts 426 and 427, respectively, upon energizing relay BS1. Associated with relay HS is a normally opened contact arm 428 adapted to be moved into engagement with fixed contact 429 upon energizing said relay. Normally closed contact arm 430 is associated with relay HS and is adapted to be moved by said relay to disengage from fixed contact 431.

Associated with relay UA are two contact arms 432 and 433. Arm 432 normally engages fixed contact 434, but is adapted to be moved by energized relay UA out of engagement therewith and into engagement with fixed contact 435. Arm 433 is adapted to be moved by energized relay UA into engagement with fixed contact 436. Associated with relay US are two contact arms 437 and 438. Arm 437 normally engages fixed contact 439 but is adapted to be moved by energized relay US into engagement with fixed contact 440. Arm 438 is adapted to be moved into engagement with fixed contact 441 upon energizing relay US.

Associated with relay LA is a switch arm 442 normally in engagement with fixed contact 443 but adapted to be moved out of engagement therewith upon energizing said relay. Associated with relay LS is a contact arm 444 normally in engagement with fixed contact 445 and adapted to be moved out of engagement therewith upon energizing relay LS.

The beam motor BM has a field coil 446, one end of which is connected by wire 447 to contact arm 420, the other end of which is connected by wire 448 to contact arm 428. The armature of motor BM is connected at one terminal by wire 449 to contact arm 421 and at the other terminal by wire 450 to fixed contact 431. Switch arm 430 is connected by wire 451 to a variable resistance R, the other end of which is connected by wire 452 to the wire 449. Field coil 446 of said motor is connected by wire 448 and wire 453 through a resistance R1 to fixed contact 429.

The unit weight motor UWM is provided with a field coil 454, one end of which is connected to plus power supply, the other end of which is connected by wire 455 to spring contact finger 397, and by wires 455 and 455a through a resistance RF to the spring contact finger 392, and by wires 455 and 398 to contact finger 393. One terminal of the armature of said motor is connected by wire 456 to contact arm 433, and by wires 456 and 456a to spring contact finger 395. The other terminal of said armature is connected by wire 457 to contact arm 438, and by wires 457 and 457a through a resistance RS to spring contact finger 390. Spring contact finger 391 is connected by wire 399 to spring contact finger 394. Spring contact finger 396 is connected by wire 400 to the fixed contact 436 of relay UA and by wires 400 and 455a through the resistance RF to the field 454 of motor UWM, and to the spring contact finger 392.

One end of coil 401 of relay BA is connected to plus power supply, and the other end by wire 458 to contact 99. Coil 402 of relay BS is connected at one end to plus power supply and at the other end by wire 459 to contact 100. One end of coil 403 is connected to plus power supply, and the other end is connected by wire 460 to contact 101, and by wire 461 to contact 98. Contact 116 is connected to minus power supply.

Coil 404 is connected at one end to plus power supply, and at the other end by wire 462 to fixed contact 413. Coil 405 of relay BSI is connected at one end to plus power supply and at the other end by wire 463 to the fixed contact 417. Coil 406 of relay UA is connected at one end by wire 464 to contact arm 411, and at the other end by wire 465 to fixed contact of switch UAI. Coil 407 of relay US is connected at one end by wire 466 to the contact finger 291, and at the other end by wire 467 to fixed contact 418 and by wires 467 and 468 to switch 48; and by wires 467, 468 and 469 to one end of coil 409 of relay LS. The other end of coil 409 is connected to minus power supply. Coil 408 of relay LA is connected at one end to minus power supply, and at the other end by wire 470 to arm 411, and by wires 470 and 471 to switch 49.

Fixed contact 424 associated with relay BAI, is connected by wire 472 to arm 423; and by wires 472 and 473 to wire 450. Arm 421 associated with said relay, is connected by wire 474 to fixed contact 426. Arm 422 associated with relay BSI, is connected by wire 475 to arm 420. Fixed contact 425 is connected by wire 476 to fixed contact 443. Fixed contact 427 is connected by wire 477 to the fixed contact 445.

Arm 410 associated with relay BA is connected to minus power supply. Fixed contact 414 is connected by wire 478 to limit switch USI; and by wires 478 and 479 to one end of coil 284. Arm 415 associated with relay BS, is connected to minus power supply. Arm 416 is connected by wire 480 to switch USI.

Arm 432 associated with relay UA, is connected to minus power supply. Fixed contact 434 is connected by wire 481 to contact arm 437. Fixed contact 435 is connected by wire 482 to arm 438. Arm 433 is connected by wire 483 to fixed contact 440. Fixed contact 436 is connected by wire 484 to fixed contact 441. Fixed contact 439 is connected by wires 485 and 486 to arm 442; and by wires 485 and 487 to arm 444. Switch UAI is connected by wire 488 to finger contact 292. Minus power supply is connected to finger contacts 290 and 293 and to the other end of coil 284 of the electromagnet 285. Switches 48 and 49 are connected by wire 489 to each other and to plus power supply.

The operation of the scale and the beam motor BM will now be described.

When a load is placed on load arm 76, beam 20 is tilted upwardly closing the contacts 116, 99 and 98. Closing contacts 116 and 99 energizes the relay BA, the circuit being from minus power supply, contacts 116, 99, wire 458, coil 401 to plus power supply. Closing contacts 116, 99 and 98 energizes relay HS, the circuit being from minus power supply, contacts 116, 99 and 98, wires 461 and 460 through coil 403 of said relay to plus power supply. Relay HS then closes switch 428, 429 and opens switch 430, 431.

Energizing relay BA closes switch 410, 413 to energize relay BAI, the circuit being from minus power supply, switch 410, 413, wire 462, through coil 404 to plus power supply. Relay BAI closes the switches 420, 424 and 421, 425 to complete the circuit for motor BM. As switch 428, 429 is closed, the circuit for said motor is from plus power supply, through said switch, wire 448, field coil 446, wire 447, switch 420, 424, wires 472, 473 through the armature of said motor, wire 449, switch 421, 425, wire 476, switch 443, 442, wires 486, 485, switch 439, 437, wire 481, switch 434, 432 to minus power supply.

Motor BM rotates the threaded rod 50 to advance the traveling poise 53. As poise 53 nears the equilibrium position, contact 98, 99 opens, deenergizing the relay HS. By deenergizing relay HS, switch 428, 429 opens and switch 430, 431 closes. By opening switch 428, 429 the circuit for motor BM is through resistance RI, wires 453, 448, reducing the current to said motor thus reducing its speed. By closing switch 430, 431, the variable resistance R is connected in shunt across the terminals of the motor armature through wires 450 and wires 451, 452 and 449. Resistance RI may be adjusted so that the motor BM will rotate at a predetermined slow rate of speed.

When the traveling poise 53 reaches the point where it offsets the load applied to yoke 70, contacts 116, 99 will open, stopping the motor BM and deenergizing the electromagnet BB to apply a brake to said motor.

When beam 20 is tilted downwardly by taking off a portion of the applied load, contacts 116, 100, and 101 will close to operate the motor BM in a reverse rotation, to move the poise from right to left (Fig. 1).

By closing contacts 116, 100 and 101, relay HS will be energized in the manner previously described, and relay BS will be energized through wire 459. Energizing relay BS will close the switches 415, 417 and 416, 418. Closing switch 415, 417 will energize relay BSI through wire 463 and coil 405. Relay BSI will then close switches 422, 426, and 423, 427 to operate the motor BM in an opposite direction. The motor circuit is now from plus power supply, through switch 428, 429, wire 448, coil 446, wire 447, wire 475, switch 422, 426, wires 474 and 449, the armature of motor BM, wires 473, and 472, switch 423, 427, wire 477, switch 445, 444, wires 487 and 485, switch 439, 437, wire 481, switch 434, 432, to minus power supply.

Contacts 116, 100 and 101 will open and close in response to the operation of the beam to a load in the same manner as hereinbefore described. When contacts 116 and 100 are alone closed, relay HS becomes deenergized to permit the motor BM to operate at a low rate of speed, the circuit for said motor being then through the resistance R and through the shunt resistance Rl.

When the beam 20 is loaded beyond the capacity of the beam, poise 53 will be moved to the right (Fig. 1) in the manner previously described, until the stud 53a on said poise engages and closes the beam limit switch 49. By closing the beam limit switch 49, the circuit for motor BM is opened, stopping the motion of poise 53 and operating the unit weight motor UWM to add weights to the beam to increase the capacity thereof.

Closing limit switch 49 energizes the relay LA, the circuit being from plus power supply through wire 489, switch 49, wire 471, coil 408 to minus power supply. Relay LA opens switch 442, 443, opening the circuit of motor BM, stopping the same. Closed switch 49 also closes a circuit to energize the electromagnet 285 to operate the friction clutch of the motor UWM, and to close the switches 290, 291 and 292, 293 and the switch 392, 393; and open the switch 390, 391. The energizing circuit for electromagnet 285 is from plus power supply, through wire 489, switch 49, wires 471 and 470, closed switch 411, 414 (relay BA remaining energized by the closure of beam switch 116, 99), wires 478 and 479, through coil 284 of relay 285, to minus power supply.

Relay UA also becomes energized by closing beam limit switch 49, the circuit being from plus power supply, wire 489, switch 49, wires 471, 470 and 464, coil 406 of relay UA, wire 465, the unit weight limit switch UAl, wire 488, through closed contacts 292, 293, to minus power supply. Energizing relay UA will open switch 432, 434, opening the circuit of motor BM at second point, and will close the switches 432, 435 and 433, 436 to operate the unit weight motor UWM. Prevention of concurrent operation of motors BM and UWM is thus assured. The circuit for operating motor UWM may be traced from minus power supply through switch 432, 435, wires 482 and 457, through the armature of motor UWM, wire 456, switch 433, 436, wires 484, 400, switch 392, 393, wires 398 and 455, the field coil 454 of said motor, to plus power supply. Motor UWM thus operates turning shaft 260 to deposit a unit weight on the beam of said scale, as has heretofore been described.

As long as the beam limit switch 49 remains closed, the circuits hereindescribed remain closed to operate the unit weight motor UWM. The gearing is so proportioned that 5° revolution of cam shaft 182 corresponds to a complete revolution of disc 325. There is however such oversize in notches of cams 185, and in projections of cams 186 that the plus unit weights will drop onto, and the minus unit weights will be lifted off, the beam 20, approximately ⅓ of a revolution of disc 325 in advance to the completion of a full revolution of said disc.

It is to be here noted that the operation of cams 185 and 186 is so timed as to deposit or take off their respective unit weights from beam 20 when disc 325 has completed approximately two-thirds of a revolution. Let us assume that weight is deposited on said beam, increasing the capacity of the beam above the load applied, tilting said beam downwardly to close the beam contacts 116, 100 and 101. Relay BA is thus deenergized while relay BS becomes energized. The beam limit switch 49 still remains closed due to the poise remaining at the right hand end of the beam (Fig. 1).

By deenergizing relay BA, switch 411, 414 opens, opening the energizing circuit of electromagnet 285. The circuit for relay UA however remains unaffected as the energizing circuit for that relay is shunted around switch 411, 414 through the wires 470 and 464. By deenergizing the electromagnet 285, lever 296 will rotate under action of spring 329 through a small angle until lug 328 contacts periphery of disc 325, as the disc 325 has only completed about two thirds of a revolution. This action will close switch 390, 391 and open switch 392, 393. Switches 290, 291 and 292, 293 remain closed because lug 328 still rides on disc 325. The circuit for relay UA remains complete, permitting the motor UWM to rotate disc 325 a complete revolution.

By opening switch 392, 393 the motor circuit for motor UWM is changed so that the field resistance RF is now in series with the field 454, the circuit now being from contact 436 through wire 400, through wire 455a and the resistance RF, wire 455, motor field 455, to plus power supply. At the same time, cam 325 has closed switch 394, 395 and opened switch 396, 397 in the manner heretofore described. By closing switch 394, 395 the resistance RF is shunted across the armature of motor UWM, the shunt circuit being from wire 457, through resistance RS, wire 457a, switch 390, 391, wire 399, switch 394, 395, wire 456a, to wire 456. Thus, the current through motor UWM is reduced so that said motor now runs at a reduced rate of speed, for the last portion only of the revolution of disc 325.

Upon completion of the revolution, lug 328 falls into the notch 326 of said disc opening the contacts 290, 291, 292, 293, permitting the relay UA to deenergize. Thus, motor UWM is stopped, calling into play the braking mechanism hereinbefore described.

Upon deenergizing relay UA, switch 432, 435 opens and switch 432, 434 closes. As contacts 116, 100, 101 have been closed, relays BS, BSl and HS have been energized, completing the circuit for motor BM previously described up to the fixed contact 434. Thus, upon closing switch 432, 434 the circuit for said motor is completed, permitting the motor BM to move the poise 53 to its equilibrium position.

It will now be understood that dropping a unit weight which together with the weight of the poise (250 pounds) overloads the scale, will cause the poise to move back to find equilibrium.

Should a "negative" load be applied to beam 20, necessitating a decrease of the capacity of the beam, beam 20 will be tilted downwardly closing contacts 116, 100 and 101. Poise 53 being in initial position will hold switch 48 closed.

By holding the limit switch 48 closed the circuit for motor BM is opened at switch 444, 445, the electromagnet 285 is energized, and motor UWM is operated to operate the cams Al86, Bl86, etc., to lift their respective unit weights off said beam.

Switch 48 being closed, relay LS is energized, the circuit being from plus power supply through wire 489, switch 48, wires 468 and 469, coil 409 of said relay, to minus power supply. Relay LS opens switch 444, 445, breaking the circuit for motor BM previously described. Electromagnet 285 is energized by closing switch 48 by a circuit through said switch, wire 468, closed switch 418, 416 (relay BS being energized), wire 480, unit weight limit switch USl, wires 478 and 479, coil 284 of said electromagnet to minus power supply. Electromagnet 285 closes contacts 290, 291 and 292, 293 actuates lever 296 to lift the lug 328 out of notch 326 in disc 325, and opens switch 390, 391 while closing switch 392, 393. Relay US is energized by a circuit through switch 48, wires 468 and 467, coil 407 of said relay, wire 466, closed contacts 291, 290 to minus power supply.

Relay US opens switch 437, 439, opening the circuit for motor MB in a second place; and closes switches 437, 440 and 438, 441 to operate the motor UWM. The motor circuit may be traced from minus power supply through switch 432, 434, wire 481, switch 437, 440, wires 483 and 456, through the armature of said motor, wire 457, switch 438, 441, wires 484, 400 and 455a, switch 392, 393, wires 398 and 455, field coil 454 to plus power supply. It is to be noted that the current through motor UWM has been reversed, permitting said motor to rotate in a reverse direction. The cams A186, B186, etc., are thus rotated in a counterclockwise direction (Figs. 6 and 15), to lift their respective unit weights A206, B206, etc., off scale 20.

When the capacity of beam scale 20 has been sufficiently decreased, the beam will be tilted so that beam contacts 116, 99, and 98 close completing the circuits hereinbefore described. Electromagnet 295 will be deenergized upon opening switch 416, 418 of relay BS. Switch 390, 391 will then be closed, and switch 394, 395 will be closed by cam 325, to insert the resistances RF and RS in the circuit of motor UWM to reduce its speed, as heretofore described. The circuit for motor BM will be completed up to the fixed contact 439. When disc 325 has completed its revolution, contacts 290, 291 open, permitting relay US to deenergize. Switch 437, 440 is thus opened and switch 437, 439 closes to complete the circuit for motor BM previously described. Thus motor BM may move poise 53 to the equilibrium position offsetting the "negative" load applied.

The circuit described will also permit disc 325 to make several revolutions before being stopped in the manner described. Assume, that a positive force of 3100 pounds is applied to the beam 20. We know from table A of Fig. 16, that shaft 182 must be rotated 60° in a clockwise direction. We also know that for each 5° rotation of said shaft the motor UWM must rotate disc 325 one complete revolution. To add 3000 pounds to bar 60, disc 325 must make 12 complete revolutions.

When the weight is applied, contacts 98, 99 and 116 are closed to operate the motor BM to move the poise 53 on rod 50. The limit switch 49 is closed when said poise reaches the end of the beam, stopping motor BM and energizing the electromagnet 285 to operate the motor UWM. As has been heretofore described, switches 290, 291 and 292, 293 are closed when said electromagnet becomes energized, and remain closed even though said electromagnet becomes deenergized, as long as lever 296 engages the periphery of cam 325. Switches 390, 391 and 392, 393 on the other hand, remain closed and opened, respectively, only as long as electromagnet 285 remains energized.

Thus as long as poise 53 remains at the right hand side of beam 20 and holds the limit switch 49 closed, the electromagnet 285 remains energized. Thus, switch 390, 391 remains open and switch 392, 393 remains closed. By holding switch 390, 391 open, the shunt circuit for resistance RS remains open preventing its insertion into the circuit of motor UWM. Keeping switch 392, 393 closed provides a shunt circuit around the resistance RF preventing its connection into said motor circuit. Thus, motor UWM will be rotated 11 full revolutions at high speed to offset the 3100 pound load applied. During the twelfth revolution, electromagnet 285 becomes deenergized setting up the circuits heretofore described to decrease the speed of motor UWM. It is to be noted that opening or closing of switches 394, 395 and 396, 397 by cam 342 take no part in the above operation. These switches are only effective when electromagnet 285 becomes deenergized and switches 390, 391 and 392, 393 are actuated, which occurs during the last third of the last revolution of disc 325.

It is now obvious that when a load is taken off beam 20, by the operation of beam contacts 116, 98, 99, 100 and 101, and the limit switches 48 and 49, the poise 53 is returned automatically to its initial, no load, equilibrium position.

When scale beam 20 is loaded beyond its total capacity, the unit weight motor UWM will operate to deposit the unit weights 205 on bar 60. When all of said unit weights are on said bar, cam shaft 182 will have been rotated through an angle of 155° in a clockwise direction. Stud 187b will then open switch UAI. By opening switch UAI, the energizing circuit hereinbefore described for relay UA is opened deenergizing that relay and opening the circuit of motor UWM. Thus, motor UWM and motor BM are stopped, preventing any overrunning of the parts and preventing injury thereto.

In like manner, when a negative force is applied to beam 20, below the negative capacity of said beam, switch USI is opened by stud 187a, upon rotation of shaft 182 in a counterclockwise direction for 155°. Opening switch USI, opens the energizing circuit of relay US thus opening the circuit of motor UWM. Switch USI controls relay 284 which in turn controls relay US through contacts 290, 291.

It is therefore apparent that scale beam 20 will not be operated beyond its negative or positive limits.

Integrator mechanism

Means is provided to integrate the weight as represented by the position of poise 53 on threaded rod 50, and the capacity weight as represented by the unit weights added to or taken off the beam 20, and to record or indicate the resultant weight at a point remote from the scale cabinet 10.

To this end, there is fixed to the upright wall 252 in Figs. 8 and 9, a self-synchronous receiver BSS and a self-synchronous transmitter RSS, well known in the art, provided with the armature shafts 350 and 351, respectively. The armature of transmitter RSS is driven, as will hereinafter be described. Fixed to the ends of shaft 350, 351, adjacent the rear wall 253, are spur gears 352 and 353, respectively. Receiver BSS receives energy from transmitter BS on beam 20, and operates in synchronism therewith, as will hereinafter be described.

Fixed in rear wall 253 and wall 255, and in horizontal alignment are ball bearings 354 and 355, respectively, having rotatably mounted therein a shaft 356 (Fig. 12). Fixed to said shaft between walls 253 and 255 and held centered as by collars 357a is a differential device 357, comprising a gear bearing member 358 adapted to rotate with shaft 356, bearing two gears 359 and 360 meshing with each other and overlapping each other. Rotatably mounted on shaft 356, adjacent wall 253 and within member 358, is a compound gear member 361 having a gear 361a and a gear 361b. Gear 361b meshes with the teeth of gear 360. Rotatably mounted on shaft 356, adjacent wall 255 and partially within member 358, is a second compound gear member 362 having gear 362a and gear 362b. Gear 362b meshes with the teeth of gear 359. Fixed to the end of said shaft adjacent the front surface of wall 253 is a gear 363.

Fixed in wall 255, above bearing 355, is a bearing 364 supporting a horizontal shaft 365 passing through a similar bearing (not shown) in wall 253. Fixed to the end of said shaft, adjacent wall 253, and meshing with gear 363 and gear 353, is a gear 366. Thus shaft 356 bearing the differential 357 is connected to the self-synchronous transmitter RSS.

Journaled through rear wall 253 and in wall 255 is another horizontal shaft 370. Fixed to said shaft adjacent wall 255, and meshing with gear 362a of the compound gear member 362, is a gear 371. Fixed to the end of shaft 370, adjacent the front surface of rear wall 253 and meshing with gear 352 is a gear 372. The self-synchronous receiver BSS is thus connected to one side of the differential 357.

Journaled in the walls 253 and 255 is a horizontal shaft 375. Fixed to said shaft adjacent to wall 355, and meshing with the gear 269, is a pinion 376. Fixed to shaft 375, and meshing with gear 361a of the compound gear member 361, is a gear 377. Thus, the unit weight motor UWM is connected to the other side of the differential 357.

Referring now to Fig. 14, the beam self-synchronous transmitter BS is provided with a field coil 493 connected across the terminals of a source of power, while the armature of said motor is connected by wires 490, 491 and 492 to the armature of the self-synchronous motor BSS. The field coil 494 of receiver BSS is also connected across the terminals of a source of power. When motor BM operates to rotate the threaded rod 50, the self-synchronous transmitter BS is rotated thereby through gears 85 and 92, previously described. As transmitter BS is rotated a three phase current is generated which is transmitted to the armature of receiver BSS. As a result, the armature receiver BSS is rotated thereby, the amount and rate of rotation always being in step with the amount and rate of rotation of transmitter BS. The angle of rotation of the armature of receiver BSS is always directly proportional to the angle of rotation of beam motor BM. The angle of rotation of receiver BSS is, therefore, a direction indication of the position of poise 53 on the rod 50 in offsetting a load applied to said beam and may readily be calibrated into units of weight.

Referring to Figs. 8 and 12, when gear 269 is rotated by the unit weight motor UWM, the rotation thereof is transmitted to the compound gear member 361 through the gears 376 and 377. By rotating compound gear member 361, gear 360 of the differential 357 is rotated, causing gear 359 to be rotated. As beam motor BM does not operate while motor UWM is operating, the self-synchronous receiver BSS is at a standstill, and due to its inertia will hold the compound gear 362 from rotating by the rotation of the gear 359. Thus, the gear housing 358 is rotated, rotating shaft 356, and as a result, the armature of the self-synchronous transmitter RSS is rotated through an angle dependent upon the angle of rotation of the motor UWM.

Similarly, when receiver BSS is operated, compound gear member 362 will be rotated, rotating gears 359 and 360 to rotate the housing 358. Shaft 356 is thus rotated to rotate the armature of the transmitter RSS through an angle dependent upon the angle of rotation of the receiver BSS.

Thus, the angular rotation of the armature of transmitter RSS is equal to the summation of the angular rotation of the motor UWM and the angular rotation of receiver BSS, or, is equal to the weight of the load applied to scale beam 20 as represented by the position of poise 53 on threaded rod 50 and to the capacity of said beam as increased or decreased by the addition of the unit weights.

Referring again to Fig. 14, self-synchronous transmitter RSS is provided with a field coil 495 connected across the terminals of a source of potential. A self-synchronous receiver PSS is provided in an indicator or recorder at a point remote from the scale cabinet 10 and having a field coil 496 connected across the terminals of a source of potential. The armatures of transmitter, receivers RSS and PSS are interconnected by wires 497, 498 and 499. The armature of receiver PSS will be rotated in phase with transmitter RSS in the same manner heretofore described for the transmitter BS and receiver BSS. Thus, the angle of rotation of the armature of receiver PSS will be proportional to the total weight of the load placed on beam 20. The armature of said receiver may then be coupled in the well known manner to any indicating or printing mechanisms common on the market today, to indicate or record the weight of a load in pounds, or pounds and ounces.

It is now obvious that the braking mechanism for the unit weight motor UWM hereinbefore described, forms an essential part of the present invention. Firstly, the semi-circular arms 337 and 338, and their co-action by spring 341 on pin 335 and roller 334 in aligning the same on a radial line with notch 326 in disc 325, prevents the stripping of the gear trains hereinbefore described. Secondly, and more important, is the fact that cam 325 is stopped exactly at the zero position. Were this not so, the slightest deviation of said cam from the initial zero position will give to shaft 320 an angle of rotation, which is picked up by the armature of the resultant self-synchronous transmitter RSS, through the differential 357 and its associated gear trains. Transmitter RSS in turn transmits this error to the recorder motor PSS which will then indicate an incorrect weight for the load applied to the scale beam 20.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawings, is to be interpreted as illustrative and not in a limiting sense.

Having thus described my invention, I claim as new and desire to secure by Letters Patent:

1. In a scale, a beam, a traveling poise on said beam, means including a motor on said beam for driving said poise, a synchronous transmitter, receiver set comprising a transmitter part on said beam, and a receiver part remote from said beam, means operated by said motor to drive said transmitter part, a second motor, means controlled by the second motor for selectively loading and unloading unit weights to said beam, a differential mechanism having two inputs and one output, means controlled by said receiver part of said transmitter, receiver set to drive one of the inputs of said differential mechanism, means connected to said second motor to drive the second input of said differential mechanism, a second synchronous transmitter, receiver set comprising a transmitter part and a receiver part, and means connected to the output of said differential mechanism to operate said transmitter part of said second synchronous transmitter, receiver set.

2. In a scale, a beam, a traveling poise on said beam, means including a motor on said beam for driving said poise, a synchronous transmitter, receiver set comprising a transmitter part on said beam, and a receiver part remote from said beam, means operated by said motor to drive said transmitter part, a second motor, means controlled by the second motor for selectively loading and unloading unit weights to said beam, a differential mechanism having two inputs and one output, means controlled by said receiver part of said transmitter, receiver set to drive one of the inputs of said differential mechanism, means connected to said second motor to drive the second input of said differential mechanism, a second synchronous transmitter, receiver set comprising a transmitter part and a receiver part, means connected to the output of said differential mechanism to operate said transmitter part of said second synchronous transmitter, receiver set, and a remote recorder operatively connected to the receiver part of said second synchronous transmitter, receiver set and operated thereby.

3. In a scale, a beam, a travelling poise on said beam, means including a motor on said beam for driving said poise, a synchronous transmitter, receiver set comprising a transmitter part on said beam, and a receiver part remote from said beam, means operated by said motor to drive said transmitter part, a second motor, means controlled by the second motor for selectively loading and unloading unit weights to said beam, a differential mechanism having two inputs and one output, means controlled by said receiver part of said transmitter, receiver set to drive one of the inputs of said differential mechanism, means connected to said second motor to drive the second input of said differential mechanism, a second synchronous transmitter, receiver set comprising a transmitter part and a receiver part, means connected to the output of said differential mechanism to operate said transmitter part of said second synchronous transmitter, receiver set, and means controlled by the positions of said beam and said poise to selectively control the operation of said differential mechanism by said second motor and by the receiver part of said first synchronous transmitter, receiver set.

4. In a scale, a beam, a traveling poise on said beam, means including a motor on said beam for driving said poise, a synchronous transmitter, receiver set comprising a transmitter part on said beam, and a receiver part remote from said beam, means operated by said motor to drive said transmitter part, a second motor, means controlled by the second motor for selectively loading and unloading unit weights to said beam, a differential mechanism having two inputs and one output, means controlled by said receiver part of said transmitter, receiver set to drive one of the inputs of said differential mechanism, means connected to said second motor to drive the second input of said differential mechanism, a second synchronous transmitter, receiver set comprising a transmitter part and a receiver part, means connected to the output of said differential mechanism to operate said transmitter part of said second synchronous transmitter, receiver set, and means controlled by the positions of said beam and said poise to selectively control the operation of said differential mechanism by said second motor and by the receiver part of said first synchronous transmitter, receiver set, said means for selectively loading and unloading unit weights to the beam, comprising a plurality of co-axial, rotary cam members relatively fixed to one another, and operatively connected to said second motor to be driven thereby, each of said rotary cam members being adapted to control the application to and removal from the beam of one unit weight.

5. In a scale, a beam, a traveling poise on said beam, means including a motor on said beam for driving said poise, a synchronous transmitter receiver set comprising a transmitter part on said beam, and a receiver part remote from said beam, means operated by said motor to drive said transmitter part, a second motor, means controlled by the second motor for selectively loading and unloading unit weights to said beam, a differential mechanism having two inputs and one output, means controlled by said receiver part of said transmitter, receiver set to drive one of the inputs of said differential mechanism, means connected to said second motor to drive the second input of said differential mechanism, a second synchronous transmitter, recevier set comprising a transmitter part and a receiver part, means connected to the output of said differential mechanism to operate said transmitter part of said second synchronous transmitter, receiver set, means controlled by the positions of said beam and said poise to selectively control the operation of said differential mechanism by said second motor and by the receiver part of said first synchronous transmitter, receiver set, said means for selectively loading and unloading unit weights to the beam, comprising a plurality of co-axial, rotary cam members relatively fixed to one another, and operatively connected to said second motor to be driven thereby, each of said rotary cam members being adapted to control the application to and removal from the beam of one unit weight, and means to limit the rotation of said rotary cams to predetermined angles.

6. In a scale, in combination, a beam, a traveling poise on said beam, means including a motor on said beam to move said poise, a transmitter on said beam and adapted to be operated by said motor, a second motor, means operative by said second motor to selectively change the capacity of said beam, a differential mechanism, said second motor being operatively connected to one input side of said differential mechanism, means controlled by said transmitter to operate another input side of said differential mechanism, a second transmitter, and means controlled by the output of said differential mechanism to operate said second transmitter.

7. In a scale, in combination, a beam, a traveling poise on said beam, means including a motor on said beam to move said poise, a transmitter on said beam and adapted to be operated by said motor, a second motor, means operative by said second motor to selectively change the capacity of said beam, a differential mechanism, said second motor being operatively connected to one input side of said differential mechanism, means controlled by said transmitter to operate another input side of said differential mechanism, a second transmitter, means controlled by the output of said differential mechanism to operate said second transmitter, a registering device, and means controlled by said second transmitter to operate said registering device.

8. In a scale, in combination, a beam, a traveling poise on said beam, means including a motor on said beam to move said poise, a transmitter on said beam and adapted to be operated by said motor, a second motor, means operative by said second motor to selectively change the capacity of said beam, a differential mechanism, said second motor being operatively connected to one input side of said differential mechanism, means controlled by said transmitter to operate another input side of said differential mechanism, a second transmitter, means controlled by the output of said differential mechanism to operate said second transmitter, and means to selectively control the operation of said differential mechanism by said second motor and by the first transmitter controlled means.

9. In a scale, in combination, a beam, a traveling poise on said beam, means including a motor on said beam to move said poise, a transmitter on said beam and adapted to be operated by said motor, a second motor, means operative by said second motor to selectively change the capacity of said beam, a differential mechanism, said second motor being operatively connected to one input side of said differential mechanism, means controlled by said transmitter to operate another input side of said differential mechanism, a second transmitter, means controlled by the output of said differential mechanism to operate said second transmitter, means to selectively control the operation of said differential mechanism by said second motor and by the first transmitter controlled means, and means to limit the rotation of said second motor to a predetermined angle.

10. In a scale, in combination, a beam, a traveling poise on said beam, means including a motor on said beam to move said poise, a transmitter on said beam and adapted to be operated by said motor, a second motor, means operative by said second motor to selectively change the capacity of said beam, a differential mechanism, said second motor being operatively connected to one input side of said differential mechanism, means controlled by said transmitter to operate another input side of said differential mechanism, a second transmitter, means controlled by the output of said differential mechanism to operate said second transmitter, means to selectively control the operation of said differential mechanism by said second motor and by the first transmitter controlled means, means to limit the rotation of said second motor to a predetermined angle, and means to operate said second motor at varying speeds during the angular rotation thereof.

11. In a scale, in combination, a beam, a traveling poise on said beam, means including a motor on said beam to move said poise, means controlled by the position of said beam to operate said motor at different speeds, a transmitter on said beam and adapted to be operated by said motor, a second motor, means operative by said second motor to selectively change the capacity of said beam, a differential mechanism, said second motor being operatively connected to one input side of said differential mechanism, means controlled by said transmitter to operate another input side of said differential mechanism, a second transmitter, and means controlled by the output of said differential mechanism to operate said second transmitter.

12. In a scale, in combination, a beam, a traveling poise on said beam, means including a motor on said beam to move said poise, a transmitter on said beam and adapted to be operated by said motor, a second motor, means operative by said second motor to selectively change the capacity of said beam, a differential mechanism, said second motor being operatively connected to one input side of said differential mechanism, means controlled by said transmitter to operate another input side of said differential mechanism, a second transmitter, means controlled by the output of said differential mechanism to operate said second transmitter, and means controlled by said poise to control the means for varying the capacity of the beam.

13. In a scale in combination, a beam, a traveling poise on said beam, means including a motor on said beam to move said poise, a transmitter on said beam and adapted to be operated by said motor, a second motor, means operative by said second motor to selectively change the capacity of said beam, a differential mechanism, said second motor being operatively connected to one input side of said differential mechanism, means controlled by said transmitter to operate another input side of said differential mechanism, a second transmitter, and means controlled by the output of said differential mechanism to operate said second transmitter, and means to render the capacity varying means inoperative when the poise has moved to a maximum position on the beam and said capacity varying means has varied the capacity of said beam a predetermined amount.

14. A scale comprising a beam movable in response to a load applied thereto, a traveling poise on said beam to offset said load, means for moving said poise relative to said beam, means controlled by the position of said beam to operate said moving means at different speeds, means to vary the capacity of said beam, means controlled by said poise to operate said capacity varying means, an indicator remote from said beam including a movable element, means controlled by the poise moving means to move said element to indicate the position of said poise on said beam, means controlled by the capacity varying means to move said element to indicate the change in capacity of said beam, whereby said indicator is adapted to register the total force applied to said beam, and means controlled by the position of said beam and the position of said poise to operate successively the poise moving means and the capacity varying means.

15. In a scale, in combination, a beam, a poise thereon, means including a motor to operate said poise, said beam being adapted to receive unit weights, means including a second motor to apply the unit weights to said beam, a totalizer comprising a single unit for totalizing the combined value of the unit weights and the value determined by the position of the poise, when the load on the scale is balanced, means operated by said motors to control said totalizer, means for recording the totals on the totalizer, and means to prevent concurrent operation of said first and second motors.

16. In a scale, a beam, means to balance a load on the scale, comprising means to selectively add predetermined loads to the beam, and means to add a variable load to the beam which in addition to the predetermined loads, will balance the load on the scale, a totalizing device comprising a single unit, capable of totalizing the values of the predetermined loads imposed on the beam, and the variable load imposed on the beam, and means operated by the selectively adding means and the variable load adding means to control the totalizing device, said totalizing device including means to move a single element of said device to a total degree corresponding to the combined values of the predetermined loads and variable load.

17. In a scale, a beam, means to balance a load on the scale comprising means to selectively add predetermined unit loads to the beam, and means to add a variable load to the beam which in addition to the predetermined loads, will balance the load on the scale, a single integrating unit comprising a differential mechanism having two input sides and one output side, means controlled by the means for adding the predetermined loads to actuate one input side of said differential mechanism, means controlled by the means for adding the variable load to actuate the other input side of said differential device.

18. In a scale, in combination, a beam, means, including a motor to impose a variable load to the beam, means, including a second motor to add predetermined unit loads to the beam, a single integrating unit comprising a differential mechanism, said second motor being operatively connected to one input side of said differential mechanism, a transmitter adapted to be operated by said first motor, means controlled by said transmitter to operate another input side of said differential mechanism.

19. In a scale, in combination, a beam, means, including a motor to impose a variable load to the beam, means, including a second motor to add predetermined unit loads to the beam, a single integrating unit comprising a differential mechanism, said second motor being operatively connected to one input side of said differential mechanism, a transmitter adapted to be operated by said first motor, means controlled by said transmitter to operate another input side of said differential mechanism, a second transmitter, and means controlled by the output of said differential mechanism to operate said second transmitter.

20. In a scale, in combination, a beam, means, including a motor to impose a variable load to the beam, means, including a second motor to add predetermined unit loads to the beam, a single integrating unit comprising a differential mechanism, said second motor being operatively connected to one input side of said differential mechanism, a transmitter adapted to be operated by said first motor, means controlled by said transmitter to operate another input side of said differential mechanism, a second transmitter, means controlled by the output of said differential mechanism to operate said second transmitter, a registering device, and means controlled by said second transmitter to operate said registering device.

21. In a scale, a beam, means to balance a load on the scale including means to automatically impose on the beam loads of predetermined values, and means to automatically additionally impose on the beam a variable load of less value than any of the predetermined loads and sufficient together with the predetermined loads, to balance the load on the scale, and means comprising a single unit, controlled by the load imposing means, to automatically totalize the predetermined loads and the variable load upon the scale becoming balanced.

22. In a scale, in combination, a beam, a travelling poise on said beam, means including a motor on said beam to move said poise, a transmitter on said beam and adapted to be operated by said motor, a second motor, means operative by said second motor to selectively change the capacity of said beam, a differential mechanism, said second motor being operatively connected to one input side of said differential mechanism. means controlled by said transmitter to operate another input side of said differential mechanism.

23. In a scale, in combination, a beam, means to apply a variable fine counter-balancing force to the beam, means for adding unit weights to said beam, means, comprising a single unit, controlled by the force applying means and weight adding means for totalizing the combined value of the variable counter-balancing force applied to the beam and the value of the unit weights applied to the beam, said totalizing means including a movable element and means to move said element to a degree corresponding to the value of the variable counter-balancing force applied to the beam, and means to move said element additionally to a degree corresponding to the value of the unit weights applied to the beam.

24. In a scale, in combination, a beam, means to apply a variable fine counter-balancing force to the beam, means for adding unit weights to said beam, means comprising a single unit, controlled by the force-applying means and weight adding means for totalizing the combined value of the variable counter-balancing force applied to the beam and the value of the unit weights applied to the beam, said totalizing means including a movable element, means to move said element to a degree corresponding to the value of the variable counter-balancing force applied to the beam, means to move said element additionally to a degree corresponding to the value of the unit weights applied to the beam, and means controlled by the totalizing means for recording the totals.

25. In a scale, in combination, a beam, means to apply a variable fine counter-balancing force to the beam, means for adding unit weights to said beam, means comprising a single unit, controlled by the force-applying means and weight adding means for totalizing the combined value of the variable counter-balancing force applied to the beam and the value of the unit weights applied to the beam, said totalizing means including a movable element, means to move said element to a degree corresponding to the value of the variable counter-balancing force applied to the beam, means to move said element additionally to a degree corresponding to the value of the unit weights applied to the beam, said element being remote from the variable counter-balancing means.

26. In a scale, in combination, a beam, means to apply a variable fine counter-balancing force to the beam, means for adding unit weights to said beam, means comprising a single unit, controlled by the force-applying means and weight adding means for totalizing the combined value of the variable counter-balancing force applied to the beam and the value of the unit weights applied to the beam, said totalizing means including a movable element, means to move said element to a degree corresponding to the value of the variable counter-balancing force applied to the beam, means to move said element additionally to a degree corresponding to the value of the unit weights applied to the beam, and means controlled by the totalizing means for recording the totals, said recording means being remote from the totalizing means.

27. In a scale, in combination, a beam, a poise thereon, means for moving the poise on the beam, means for adding unit weights to the beam, means controlled by the said poise moving means and unit adding means for totalizing the combined value of the unit weights applied to the beam and the value determined by the position of the poise on the beam, said totalizing means including a movable element, means to move said element to a degree corresponding to the value of the unit weights applied to the beam, and means to additionally move said element to a degree corresponding to the value determined by the position of the poise on the beam.

28. In a scale, in combination, a beam, a poise thereon, means for moving the poise on the beam, means for adding unit weights to the beam, means controlled by the said poise moving means and unit adding means for totalizing the combined value of the unit weights applied to the beam and the value determined by the position of the poise on the beam, said totalizing means including a movable element, means to move said element to a degree corresponding to the value of the unit weights applied to the beam, means to additionally move said element to a degree corresponding to the value determined by the position of the poise on the beam, and means controlled by said movable element for recording the totals.

29. In a scale, in combination, a beam, a poise thereon, means for moving the poise on the beam, means for adding unit weights to the beam, means controlled by the said poise moving means and unit adding means for totalizing the combined value of the unit weights applied to the beam and the value determined by the position of the poise on the beam, said totalizing means including a movable element, means to move said element to a degree corresponding to the value of the unit weights applied to the beam, means to additionally move said element to a degree corresponding to the value determined by the position of the poise on the beam, the means for moving the poise on the beam including a motor, and the means for moving said element corresponding to a degree corresponding to the position of the poise on the beam, including a self-synchronous transmitter-receiver set controlled by said motor, whereby said element is remotely controlled by said motor.

30. In a scale, in combination, a beam, a poise thereon, means for moving the poise on the beam, means for adding unit weights to the beam, means, comprising a single unit, for totalizing the combined value of the unit weights applied to the beam and the value determined by the position of the poise on the beam, said totalizing means including a movable element, means to move said element to a degree corresponding to the value of the unit weights applied to the beam, and means to additionally move said element to a degree corresponding to the value determined by the position of the poise on the beam, and means controlled by said movable element for recording the totals, a self-synchronous transmitter-receiver set connecting said recording means to said totalizing means, whereby said recording means is remotely controlled by said totalizing means.

31. In a scale, in combination, a beam, means to apply a variable fine counter-balancing force to the beam, means for adding unit weights to said beam, means, comprising a single unit, for totalizing the combined value of the variable counter-balancing force applied to the beam and the value of the unit weights applied to the beam, said totalizing means including a movable element, means to move said element to a degree corresponding to the value of the variable counter-balancing force applied to the beam, means to move said element additionally to a degree corresponding to the value of the unit weights applied to the beam, the means for applying the variable force to the beam including an electric motor, and the means for moving said element to a degree corresponding to the value of said variable force, including a self-synchronous transmitter-receiver set connecting said motor with said element.

32. A scale, comprising a beam, a travelling poise on said beam, means to move said poise relative to said beam, means to vary the capacity of said beam, a totalizer including a movable element, means controlled by the means for moving the poise to move said element to a degree corresponding to the movement of said poise on said beam from initial position, and means controlled by the means for varying the capacity of said beam to move said element to a degree corresponding to the change in capacity of said beam, whereby said element is moved to a degree corresponding to the total force applied to said beam.

33. A scale, comprising a beam, a travelling poise on said beam, means to move said poise relative to said beam, means to vary the capacity of said beam, a totalizer including a movable element, means controlled by the means for moving the poise to move said element to a degree corresponding to the movement of said poise on said beam from initial position, means controlled by the means for varying the capacity of said beam to move said element to a degree corresponding to the change in capacity of said beam, whereby said element is moved to a degree corresponding to the total force applied to said beam, and means to prevent operation of said poise moving means when said capacity varying means is operated.

34. A scale, comprising a beam, a travelling poise on said beam, means to move said poise relative to said beam, means to vary the capacity of said beam, a totalizer including a movable element, means controlled by the means for moving the poise to move said element to a degree corresponding to the movement of said poise on said beam from initial position, means controlled by the means for varying the capacity of said beam to move said element to a degree corresponding to the change in capacity of said beam, whereby said element is moved to a degree corresponding to the total force applied to said beam, means to prevent operation of the poise moving means when said capacity varying means is operated, and means to prevent operation of said capacity varying means when said poise moving means is operated.

35. In a scale, in combination, a beam, a poise thereon, means including a motor to operate said poise, said beam being adapted to receive unit weights, means including a second motor to apply the unit weights to said beam, a totalizer for totalizing the combined value of the unit weights and the value determined by the position of the poise, when the load on the scale is balanced, means for recording the totals on the totalizer, means to prevent concurrent operation of said first and second motors, said totalizer comprising a movable element, means controlled by the first motor to move said element an amount corresponding to the movement of the poise on the beam, and means controlled by the second motor to additionally move said element an amount corresponding to the unit weights applied to said beam.

36. In a scale, a beam, means to balance a load on the scale, comprising means to selectively add predetermined loads to the beam, means to add a variable load to the beam which in addition to the predetermined loads, will balance the load on the scale, a totalizing device, comprising a single unit, capable of totalizing the values of the predetermined loads imposed on the beam, and the variable load imposed on the beam, means operated by the selectively adding means and variable load adding means to control said totalizing device, said totalizing device including means to move a single element of said device to a total degree corresponding to the combined values of the predetermined loads and variable load, and means remotely controlled by said totalizing device to record the totals.

37. In a scale, in combination, a beam, a travelling poise on said beam, means including a motor on said beam to move said poise, a second motor, means operative by said second motor to selectively change the capacity of said beam, a differential mechanism, said second motor being operatively connected to one input side of said differential mechanism, and means remotely controlled by said first motor to operate another input side of said differential mechanism.

38. In a scale, a beam, means to apply a variable fine force to said beam, said means including a motor, a synchronous transmitter-receiver set, means operated by said motor to drive the transmitter part of said set, a second motor, means controlled by the second motor for selectively loading and unloading unit weights to said beam, a single integrating unit comprising a differential mechanism having two inputs and one output, means controlled by said receiver part of said set to drive one of said inputs, and means connected to said second motor to drive the other input.

39. In a scale, a beam, means to apply a variable fine force to said beam, said means including a motor, a synchronous transmitter-receiver set, means operated by said motor to drive the transmitter part of said set, a second motor, means controlled by the second motor for selectively loading and unloading unit weights to said beam, a single integrating unit comprising a differential mechanism having two inputs and one output, means controlled by said receiver part of said set to drive one of said inputs, means connected to said second motor to drive the other input, and a second synchronous transmitter-receiver set comprising a transmitter part and receiver part, and means connected to the output of said differential mechanism to operate the transmitter part of said second transmitter-receiver set.

40. In a scale, a beam, means to apply a variable fine force to said beam, said means including a motor, a synchronous transmitter-receiver set, means operated by said motor to drive the transmitter part of said set, a second motor, means controlled by the second motor for selectively loading and unloading unit weights to said beam, a single integrating unit comprising a differential mechanism having two inputs and one output, means controlled by said receiver part of said set to drive one of said inputs, means connected to said second motor to drive the other input, a second synchronous transmitter-receiver set comprising a transmitter part and receiver part, means connected to the output of said differential mechanism to operate the transmitter part of said second transmitter-receiver set, and a remote recorder operatively connected to the receiver part and said second transmitter-receiver set and operated thereby.

BENJAMIN COOPER.